US011863771B2

(12) United States Patent
Zhang et al.

(10) Patent No.: US 11,863,771 B2
(45) Date of Patent: Jan. 2, 2024

(54) UPDATING OF HISTORY BASED MOTION VECTOR PREDICTION TABLES

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 180 days.

(21) Appl. No.: 17/398,887

(22) Filed: Aug. 10, 2021

(65) Prior Publication Data
US 2021/0368187 A1 Nov. 25, 2021

Related U.S. Application Data

(63) Continuation of application No. PCT/CN2020/075082, filed on Feb. 13, 2020.

(30) Foreign Application Priority Data

Feb. 13, 2019 (WO) ................ PCT/CN2019/074964

(51) Int. Cl.
*H04N 19/00* (2014.01)
*H04N 19/436* (2014.01)
(Continued)

(52) U.S. Cl.
CPC ......... *H04N 19/436* (2014.11); *H04N 19/137* (2014.11); *H04N 19/159* (2014.11); *H04N 19/176* (2014.11); *H04N 19/51* (2014.11)

(58) Field of Classification Search
CPC ....................................................... H04N 19/00
See application file for complete search history.

(56) References Cited

U.S. PATENT DOCUMENTS

2014/0355687 A1 12/2014 Takehara et al.
2015/0237370 A1 8/2015 Zhou et al.
(Continued)

FOREIGN PATENT DOCUMENTS

CN 102215386 A 10/2011
CN 102860006 A 1/2013
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Maryam A Nasri
(74) *Attorney, Agent, or Firm* — Perkins Coie LLP

(57) ABSTRACT

A method for processing a video includes maintaining one or more tables, wherein each table includes motion candidates derived from previously processed video blocks that are processed prior to a first video block of a video; deriving motion information for the first video block; applying refinement to the motion information when at least one decoder side motion vector derivation (DMVD) technologies is enabled; performing a conversion between a bitstream representation of the first video block and the first video block using the refined motion information; and determining, whether to use the refined motion information or un-refined motion information for updating one or more tables.

20 Claims, 41 Drawing Sheets

(51) Int. Cl.
*H04N 19/137* (2014.01)
*H04N 19/159* (2014.01)
*H04N 19/176* (2014.01)
*H04N 19/51* (2014.01)

(56) References Cited

U.S. PATENT DOCUMENTS

| | | | |
|---|---|---|---|
| 2017/0332095 | A1 | 11/2017 | Zou et al. |
| 2018/0270500 | A1 | 9/2018 | Li et al. |
| 2018/0359483 | A1 | 12/2018 | Chen et al. |
| 2020/0236376 | A1* | 7/2020 | Li ............ H04N 19/176 |
| 2021/0006787 | A1 | 1/2021 | Zhang et al. |
| 2021/0037240 | A1 | 2/2021 | Zhang et al. |
| 2021/0037256 | A1 | 2/2021 | Zhang et al. |

FOREIGN PATENT DOCUMENTS

| | | | |
|---|---|---|---|
| CN | 103931196 | A | 7/2014 |
| CN | 105530516 | A | 4/2016 |
| CN | 107079161 | A | 8/2017 |
| CN | 107105268 | A | 8/2017 |
| CN | 107690809 | A | 2/2018 |
| WO | 2018012851 | A1 | 1/2018 |
| WO | 2018175720 | A1 | 9/2018 |

OTHER PUBLICATIONS

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.
Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.
Chen et al. "CE4.3.1: Shared Merging Candidate List," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0170, 2019.
Chien et al. "CE8-Related: CPR Mode Signaling and Interaction with Inter Coding Tools," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0483, 2019.
Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.
Itu-T H.265 ""High efficiency video coding"" Series H: Audiovisual and Multimedia SystemsInfrastructure of audiovisual services—Coding of movingvideo, Telecommunicationstandardization Sectorof ITU, (Feb. 2018).
Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0142, 2018.
Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.
Liu et al. "CE9: Simplification of Decoder Side Motion Vector Derivation (Test 9.2.9)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0267, 2018.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.
Sethuraman, Sriram. "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.
Zhang et al. "CE4: History-Based Motion Vector Prediction (Test 4.4.7)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0266, 2018.
Zhou, Minhua. "AHG10: Configurable and CU-Group Level Parallel Merge/Skip," Joint Collaborative Team on Video Coding (JCT-VC) of ITU-T SG 16 WP3 and ISO/IEC JTC 1/SC 29/WG 11, 8th Meeting, San Jose, CA USA, Feb. 1-10, 2012, JCTVC-H0082, 2012.
http://phenix.it-sudparis.eu/jvet/doc_end_user/current_document.php?id=5755.
https://vcgit.hhi.fraunhofer.de/jvet/VVCSoftware_VTM/tags/VTM-4.0rc1.
JEM-7.0: https://jvet.hhi.fraunhofer.de/svn/svn_HMJEMSoftware/tags/ HM-16.6-JEM-7.0.
International Search Report and Written Opinion from PCT/CN2020/075081 dated May 19, 2020 (15 pages).
International Search Report and Written Opinion from PCT/CN2020/075082 dated Apr. 26, 2020 (9 pages).

* cited by examiner

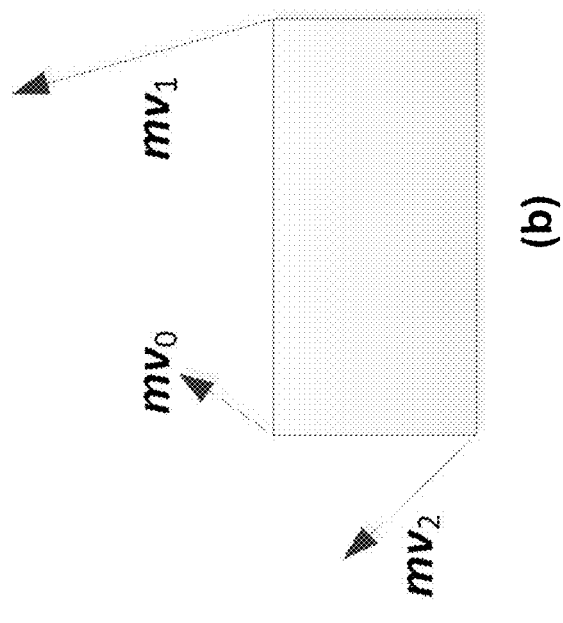
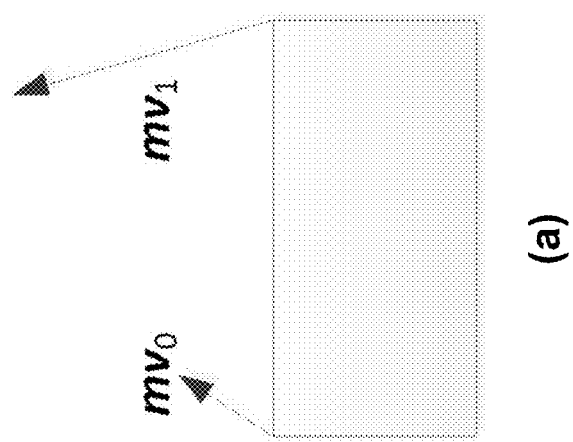
FIG. 15

FIG. 20

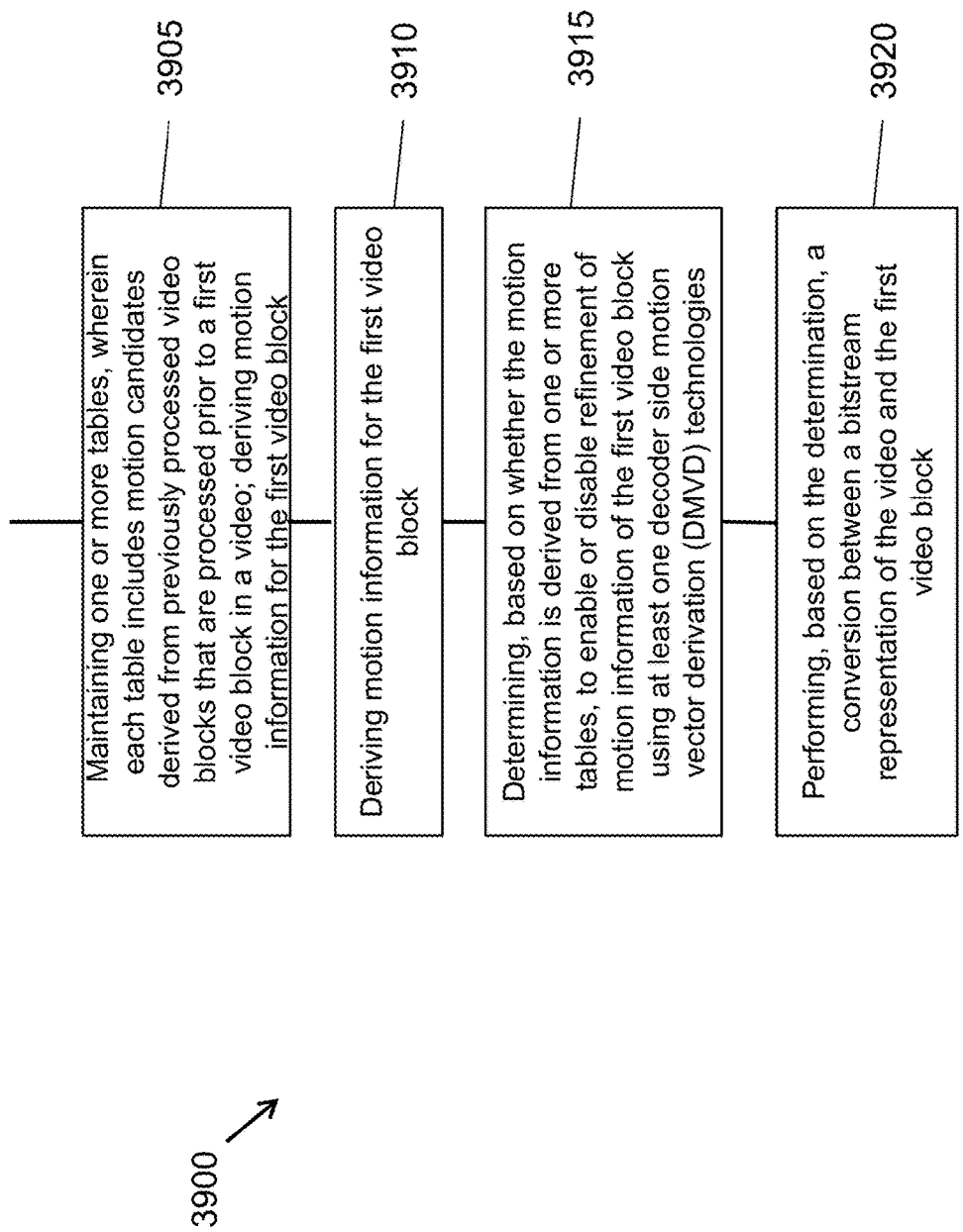

UPDATING OF HISTORY BASED MOTION VECTOR PREDICTION TABLES

CROSS-REFERENCE TO RELATED APPLICATION

This application is a continuation of International Application No. PCT/CN2020/075082, filed on Feb. 13, 2020, which claims the benefit of PCT/CN2019/074964, filed on Feb. 13, 2019. The entire disclosures of the aforementioned applications are incorporated by reference as part of the disclosure of this application.

TECHNICAL FIELD

This document is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which motion prediction under a shared merge list is used.

In one example aspect, a method of processing video is disclosed. The method includes: determining that a first video unit of a video is an Intra Block Copy (IBC) merge sharing node, and the first video unit is split into multiple child blocks wherein child blocks coded with the IBC merge mode under the first video unit are processed in parallel; deriving motion information for a first child block under the first video unit; and performing a conversion between a bitstream representation of the video and the first child block using the derived motion information, wherein motion information of any other child block under the first video is omitted in the derivation of motion information for the first child block.

In another example aspect, a method of processing video includes: determining that a first video unit of a video is an Intra Block Copy (IBC) Advanced Motion Vector Prediction (AMVP) sharing node, and the first video unit is split into multiple child blocks wherein child blocks coded with the IBC AMVP mode under the first video unit are processed in parallel; deriving motion information for a first child block under the first video unit; and performing a conversion between a bitstream representation of the video and the first child block using the derived motion information, wherein motion information of any other child block under the first video is omitted in the derivation of motion information for the first child block.

In another example aspect, a method of processing video includes: determining that a first video unit of a video is an inter Advanced Motion Vector Prediction (AMVP) motion sharing node, and the first video unit is split into multiple child blocks wherein child blocks coded with the inter AMVP mode under the first video unit are processed in parallel; deriving motion information for a first child block of the multiple child blocks which is coded with the inter AMVP mode under the first video unit; and performing a conversion between a first child block of the multiple child blocks and a bitstream representation of the video including the first video unit, based on the derived motion information, wherein motion information of any other child block under the first video unit is omitted in the derivation of motion information for the first child block.

In another example aspect, a method of processing video includes: determining that a first video unit of a video is a parameter sharing node, and the first video unit is split into multiple child blocks; deriving, during a conversion between the first child block and a bitstream representation of the video including the first video unit, parameters for a first child block of the multiple child blocks under the first video unit, wherein the first child block is coded with a coding tool; and performing the conversion based on parameters, wherein the parameters associated with the coding tool, which are derived during the conversion, are independent from the information of a second child block under the same parameter sharing node.

In another example aspect, a method of processing video includes: determining that a first video unit of a video is a motion sharing node, and the first video unit is split into multiple child blocks which are leaf nodes; deriving a motion candidate list for a first child block under the first video unit; and performing a conversion between the first child block of the multiple child blocks which is coded with a first mode and a bitstream representation of the video including the first video unit, based on the motion candidate list, wherein motion information of a second child block of the multiple child blocks coded with the first mode is omitted in a construction of the motion candidate list; and wherein motion candidates derived from a history-based motion vector prediction (HMVP) table are not added to the motion candidate list when coding or decoding the first child block.

In another example aspect, a method of processing video includes: predicting, during a conversion between a first video block and a bitstream representation of a video including the first video block, motion information of the first video block by using a motion list constructed with a first candidate list construction technique for the first video block when the first video block is outside a motion sharing node; predicting, during a conversion between a second video block of a first video unit in the video and the bitstream representation of the video, motion information of the second video block by using a merge list constructed with a second candidate list construction technique for the second video block, the second candidate list construction technique being different than the first candidate list construction technique and the first video unit is a sharing node block; and performing the conversions based on the predicted motion information of the first and second video blocks.

In another example aspect, a method of processing video includes: maintaining one or more tables, wherein each table includes motion candidates derived from previously processed video blocks that are processed prior to a first video block of a video; deriving motion information for the first video block; applying refinement to the motion information when at least one decoder side motion vector derivation (DMVD) technologies is enabled; performing a conversion between a bitstream representation of the first video block and the first video block using the refined motion information; and determining, whether to use the refined motion information or un-refined motion information for updating one or more tables.

In another example aspect, a method of processing video includes: maintaining one or more tables, wherein each table includes motion candidates derived from previously processed video blocks that are processed prior to a first video block of a video; deriving motion information for the first video block; applying refinement to the motion information when at least one decoder side motion vector derivation (DMVD) technologies is enabled; performing a conversion between a bitstream representation of the first video block and the first video block using the refined motion information; and updating the one or more tables with the un-refined motion information of the first video block.

In another example aspect, a method of processing video includes maintaining one or more tables, wherein each table includes motion candidates derived from previously processed video blocks that are processed prior to a first video block in a video; deriving motion information for the first video block; determining, based on whether the motion information is derived from one or more tables, to enable or disable refinement of motion information of the first video block using at least one decoder side motion vector derivation (DMVD) technologies; and performing, based on the determination, a conversion between a bitstream representation of the video and the first video block.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 15 shows examples of 4-parameter affine model (a) and 6-parameter affine model (b).

FIG. 20 shows an example of intra-picture block copy.

FIG. 39 is a flowchart for an example of a video processing method.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This invention is related to video coding technologies. Specifically, it is related to motion vector coding in video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Figure 25:
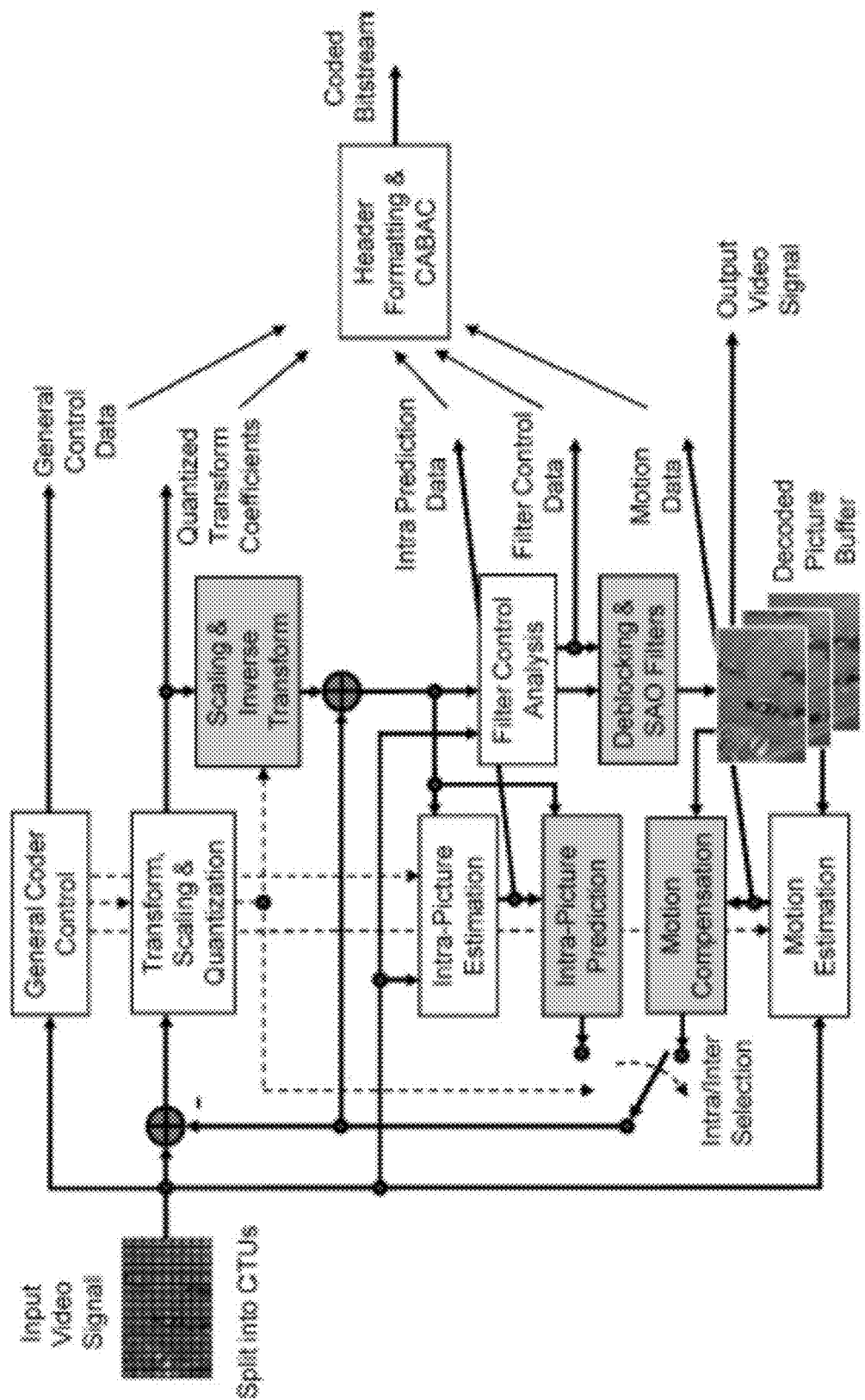
FIG. 25 shows a block diagram of an example implementation of a video encoder.

FIG. 25 is a block diagram of an example implementation of a video encoder. FIG. 25 shows that the encoder implementation has a feedback path built in in which the video encoder also performs video decoding functionality (reconstructing compressed representation of video data for use in encoding of next video data).

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode

2.1.2.1 Derivation of Candidates for Merge Mode

Figure 1:
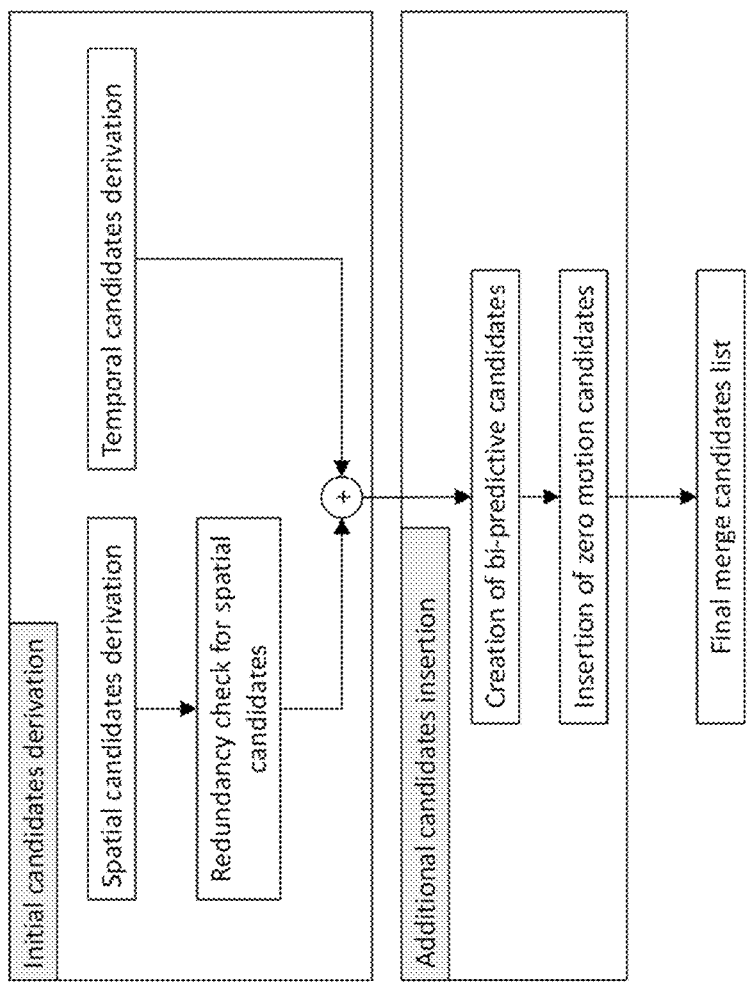
FIG. 1 shows an example of a derivation process for merge candidates list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
　Step 1.1: Spatial candidates derivation
　Step 1.2: Redundancy check for spatial candidates
　Step 1.3: Temporal candidates derivation
Step 2: Additional candidates insertion
　Step 2.1: Creation of bi-predictive candidates
　Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2. Spatial Candidates Derivation

Figure 2:
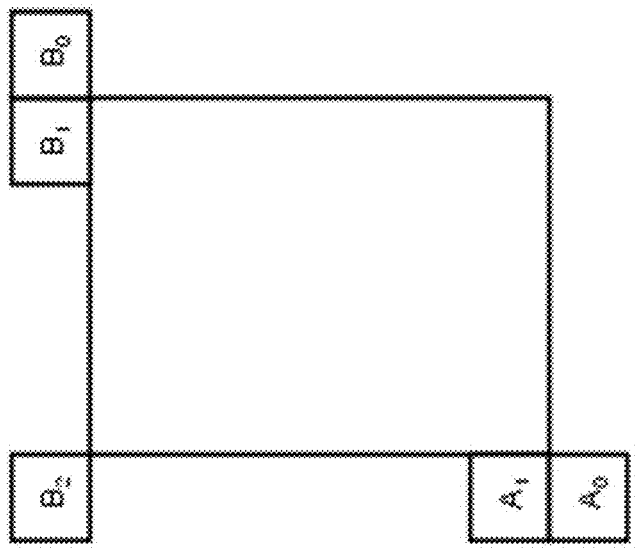
FIG. 2 shows an example of positions of spatial merge candidates.
Figure 3:
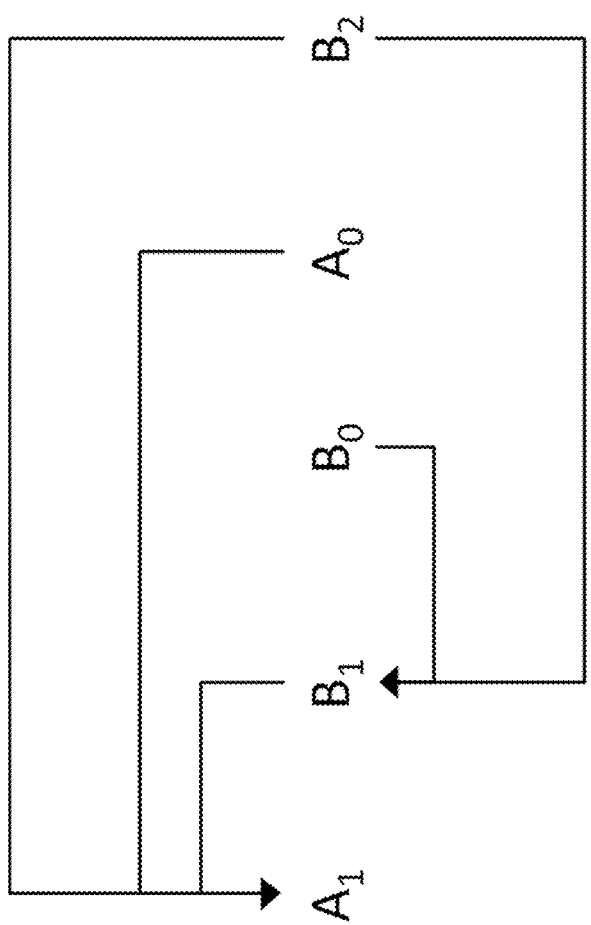
FIG. 3 shows an example of candidate pairs considered for redundancy check of spatial merge candidates.

In the derivation of spatial merge candidates, a maximum of four merge candidates are selected among candidates located in the positions depicted in FIG. 2. The order of derivation is A1, B1, B0, A0 and B2. Position B2 is considered only when any PU of position A1, B1, B0, A0 is not available (e.g. because it belongs to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information.

2.1.2.2.1 Merge Estimation Region (MER)

Figure 4:
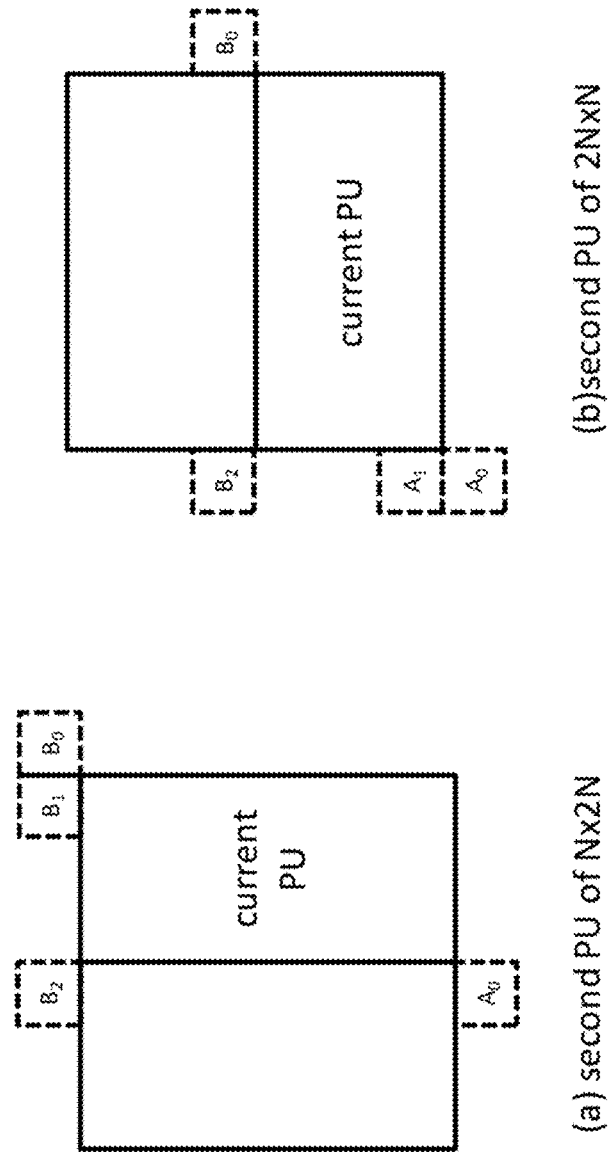
FIG. 4 shows an example of positions for a second PU of N×2N and 2N×N partitions.

Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position A1 is not considered for list construction. In fact, by adding this candidate will lead to two prediction units having the same motion information, which is redundant to just have one PU in a coding unit. Similarly, position B1 is not considered when the current PU is partitioned as 2N×N.

2.1.2.3 Temporal Candidates Derivation

Figure 5:
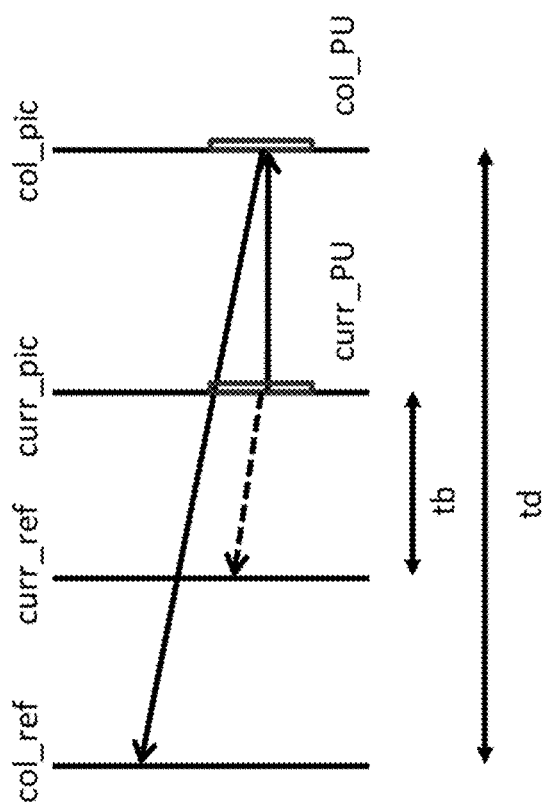
FIG. 5 shows an example of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
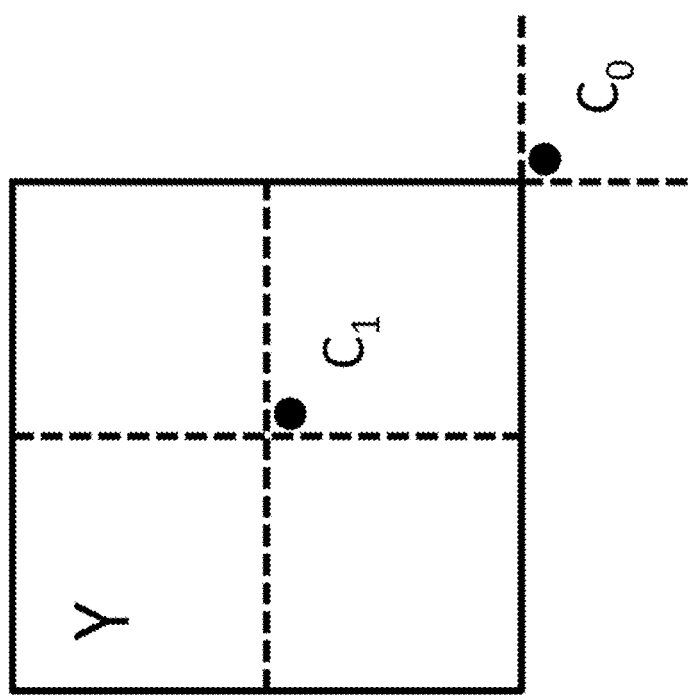
FIG. 6 shows an example of candidate positions for temporal merge candidate, C0 and C1.

In the co-located PU (Y) belonging to the reference frame, the position for the temporal candidate is selected between candidates C0 and C1, as depicted in FIG. 6. If PU at position C0 is not available, is intra coded, or is outside of the current coding tree unit (CTU aka. LCU, largest coding unit) row, position C1 is used. Otherwise, position C0 is used in the derivation of the temporal merge candidate.

2.1.2.4 Additional Candidates Insertion

Figure 7:
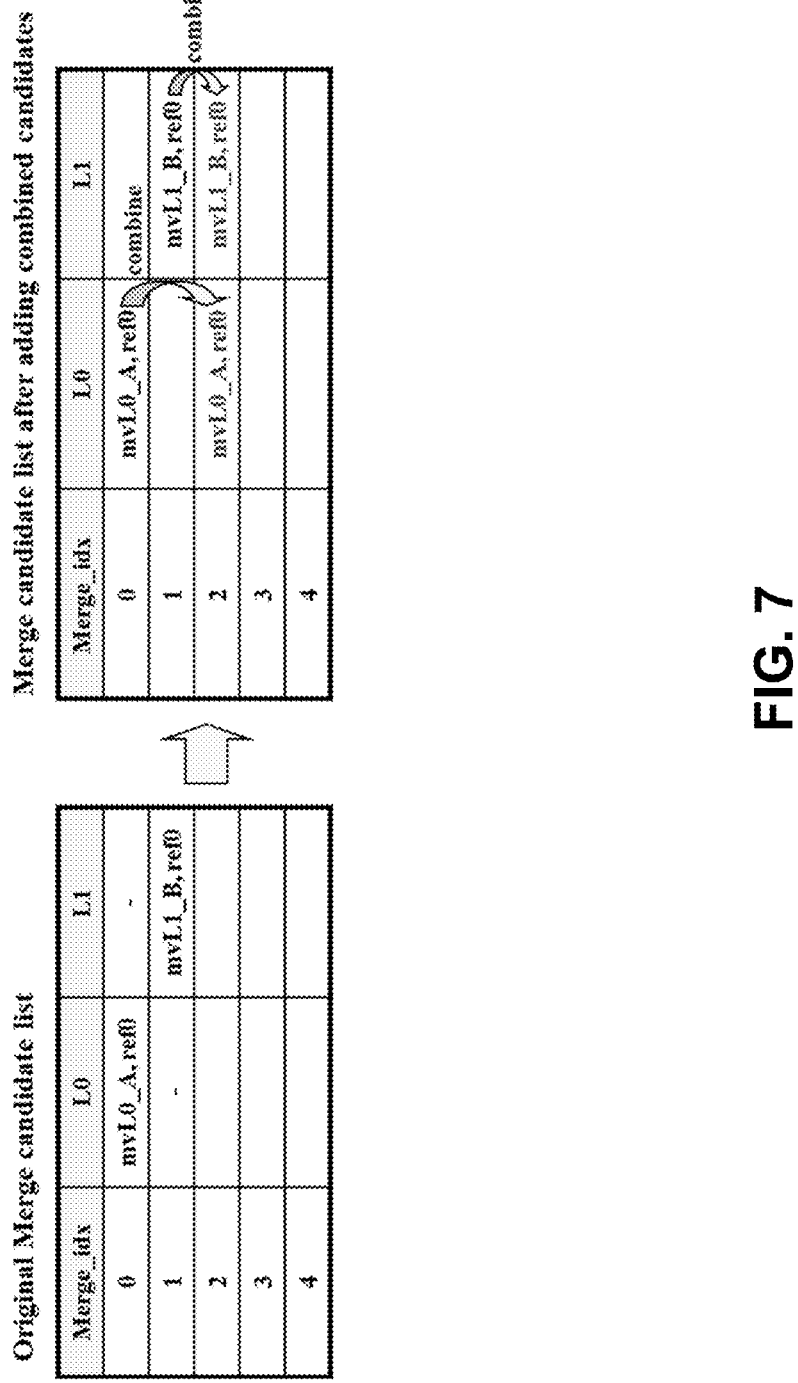
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list.

More specifically, the following steps are performed in order till the merge list is full:

Set variable numRef to either number of reference picture associated with list 0 for P slice, or the minimum number of reference pictures in two lists for B slice;

Add non-repeated zero motion candidates:

For variable i being 0 . . . numRef−1, add a default motion candidate with MV set to (0, 0) and reference picture index set to i for list 0 (if P slice), or for both lists (if B slice).

Add repeated zero motion candidates with MV set to (0, 0), reference picture index of list 0 set to 0 (if P slice) and reference picture indices of both lists set to 0 (if B slice).

Finally, no redundancy check is performed on these candidates.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
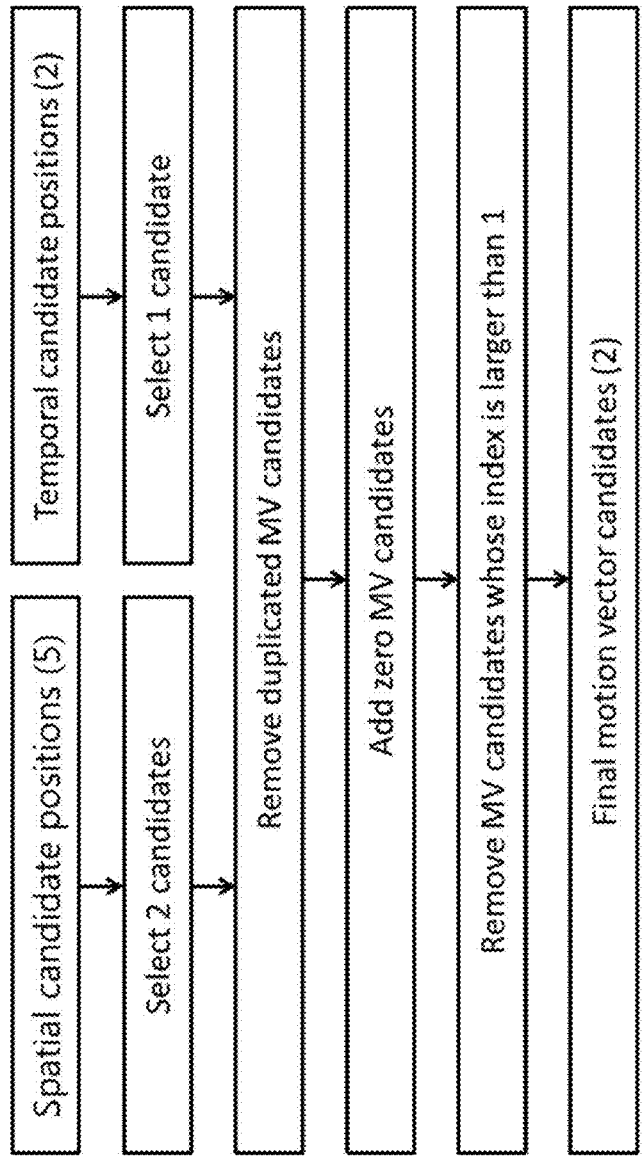
FIG. 8 shows an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as A0, A1, and scaled A0, scaled A1. The order of derivation for the above side of the current PU is defined as B0, B1, B2, scaled B0, scaled B1, scaled B2. For each side there are therefore four cases that can be used as motion vector candidate, with two cases not required to use spatial scaling, and two cases where spatial scaling is used. The four different cases are summarized as follows.

No Spatial Scaling (1) Same reference picture list, and same reference picture index (same POC)

(2) Different reference picture list, but same reference picture (same POC)

Spatial Scaling (3) Same reference picture list, but different reference picture (different POC)

(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
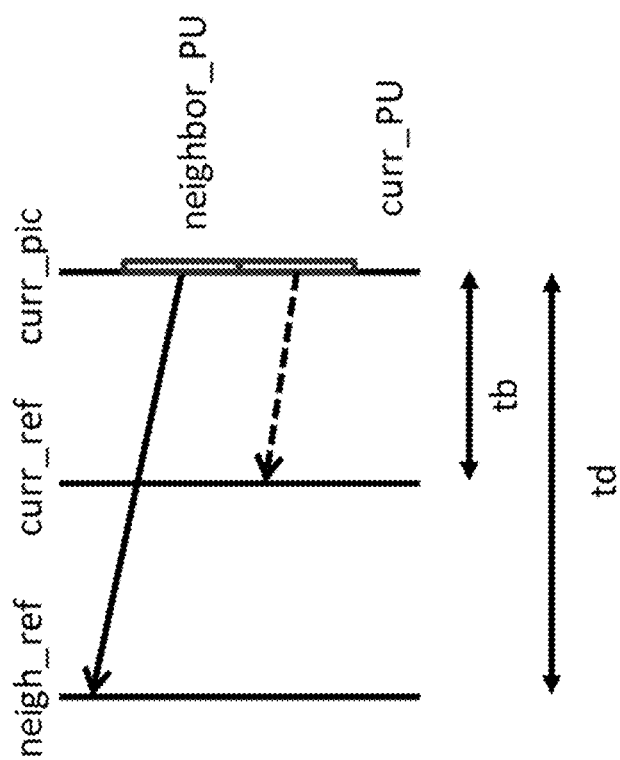
FIG. 9 shows an example of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive motion vector difference resolution (AMVR) for signaling MVD for both affine blocks and translational motion blocks, affine prediction mode, Triangular prediction mode (TPM), Alternative TMVP (ATMVP), Generalized Bi-Prediction (GBI), Bi-directional Optical flow (BIO), Intra Block Copy (IBC), etc. al.

2.2.1 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (LAMVR) is introduced.

2.2.1.1 AMVR for Translational Motion Blocks

In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.2.1.2 AMVR for Affine Motion Blocks

Similar to that design for translational motion blocks (aka normal AMVR mode), AMVR mode is extended to affine coded blocks (aka Affine AMVR mode).

For the Affine AMVR mode, three MV/MVD resolutions are supported, that is {1/16, ¼, 1}-pel.

2.2.2 Triangular Prediction Mode

Figure 10A:
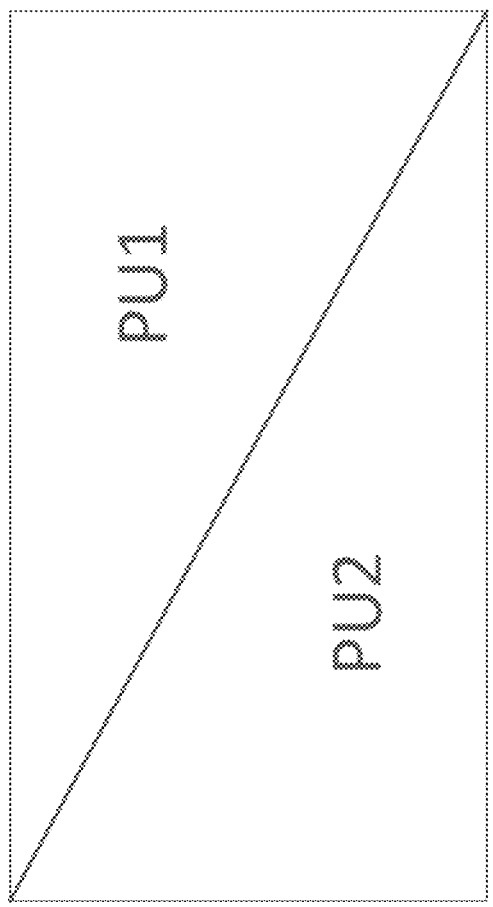
FIG. 10A shows an example of a 135 degree partition type (splitting from top-left corner to bottom-right corner).
Figure 10B:
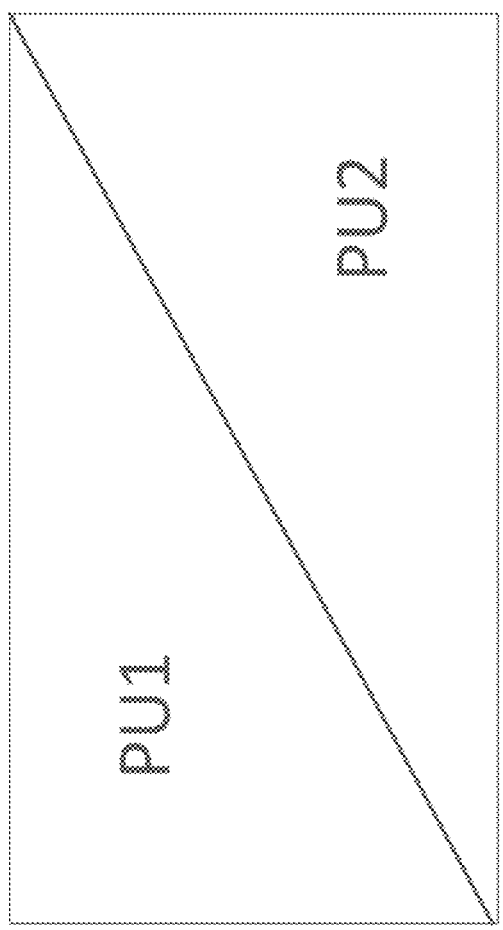
FIG. 10B shows an example of a splitting a CU into two triangular prediction units (two splitting patterns).

The concept of the triangular prediction mode (TPM) is to introduce a new triangular partition for motion compensated prediction. As shown in FIG. 10, it splits a CU into two triangular prediction units, in either diagonal or inverse diagonal direction. Each triangular prediction unit in the CU is inter-predicted using its own uni-prediction motion vector and reference frame index which are derived from a single uni-prediction candidate list. An adaptive weighting process is performed to the diagonal edge after predicting the triangular prediction units. Then, the transform and quantization process are applied to the whole CU. It is noted that this mode is only applied to merge mode (note: skip mode is treated as a special merge mode).

2.2.2.1 Uni-Prediction Candidate List for TPM

Figure 11:
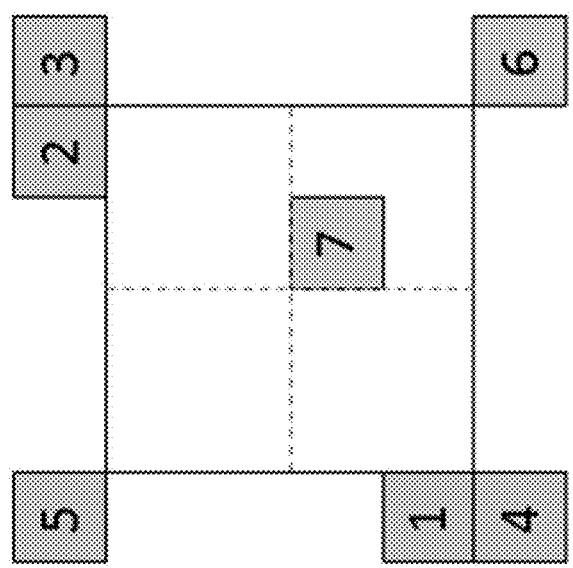
FIG. 11 shows an example of positions of neighboring blocks.
Figure 12:
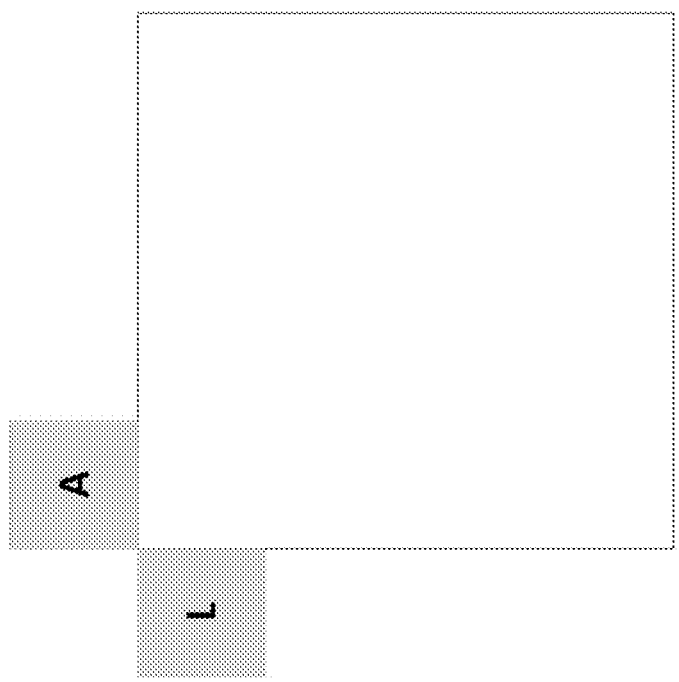
FIG. 12 shows an example of neighboring blocks (A and L) used for context selection in TPM flag coding.

The uni-prediction candidate list, named TPM motion candidate list, consists of five uni-prediction motion vector candidates. It is derived from seven neighboring blocks including five spatial neighboring blocks (1 to 5) and two temporal co-located blocks (6 to 7), as shown in FIG. 11. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:

Obtain regular motion candidates from A1, B1, B0, A0, B2, Col and Col2 (corresponding to block 1-7 in FIG. 11) with full pruning operations when adding a regular motion candidate from spatial neighboring blocks.

Set variable numCurrMergeCand=0

For each regular motion candidates derived from A1, B1, B0, A0, B2, Col and Col2, if not pruned and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.

Full pruning is applied.

For each motion candidates derived from A1, B1, B0, A0, B2, Col and Col2, if not pruned, and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.

Full pruning is applied.

For each motion candidates derived from A1, B1, B0, A0, B2, Col and Col2, if not pruned, and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.

Full pruning is applied.

For each motion candidates derived from A1, B1, B0, A0, B2, Col and Col2, if not pruned, and numCurrMergeCand is less than 5, if the regular motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.

Full pruning is applied.

If numCurrMergeCand is less than 5, zero motion vector candidates are added.

When inserting a candidate to the list, if it has to be compared to all previously added candidates to see whether it is identical to one of them, such a process is called full pruning.

2.2.2.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

1st weighting factor group: {7/8, 6/8, 4/8, 2/8, 1/8} and {7/8, 4/8, 1/8} are used for the luminance and the chrominance samples, respectively;

2nd weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The 2nd weighting factor group is used when the reference pictures of the two triangular prediction units are different from each other or their motion vector difference is larger than 16 pixels. Otherwise, the 1st weighting factor group is used.

2.2.2.3 Signaling of Triangular Prediction Mode (TPM)

One bit flag to indicate whether TPM is used may be firstly signaled. Afterwards, the indications of two splitting patterns (as depicted in FIG. 10), and selected merge indices for each of the two partitions are further signaled.

2.2.2.3.1 Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

The flag is coded with 3 contexts, based on the following equation:

Ctx index=((left block $L$ available && $L$ is coded with TPM?)1:0)+((Above block $A$ available && $A$ is coded with TPM?)1:0);

2.2.3 Affine Motion Compensation Prediction

Figure 13A:
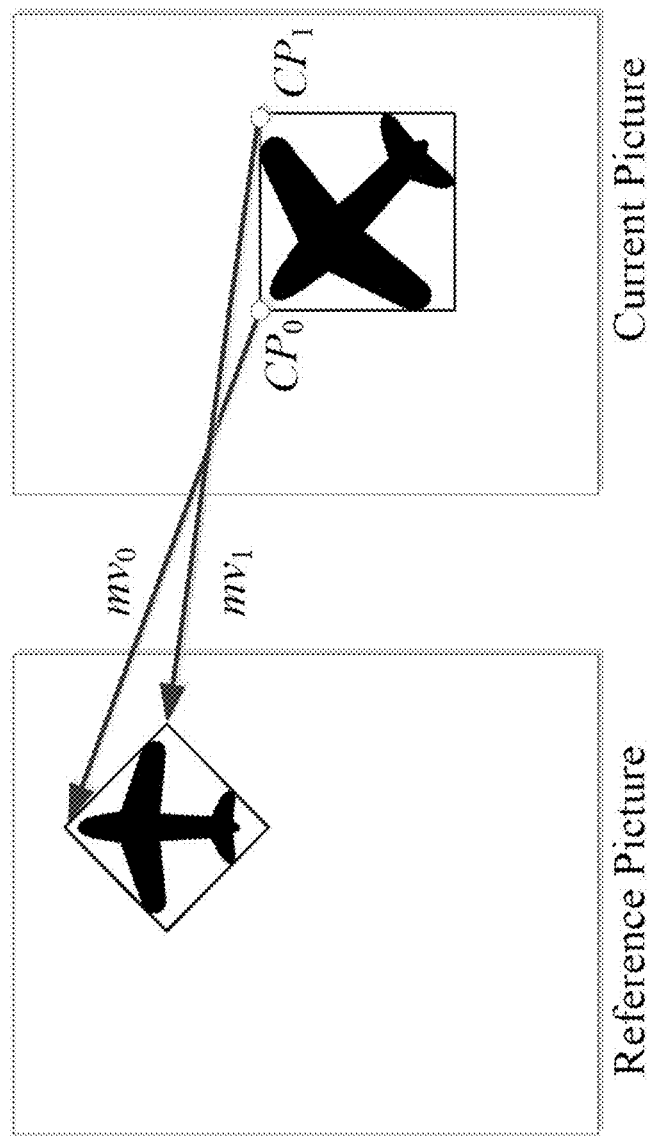
FIGS. 13A and 13B show examples of simplified affine motion model.
Figure 13B:
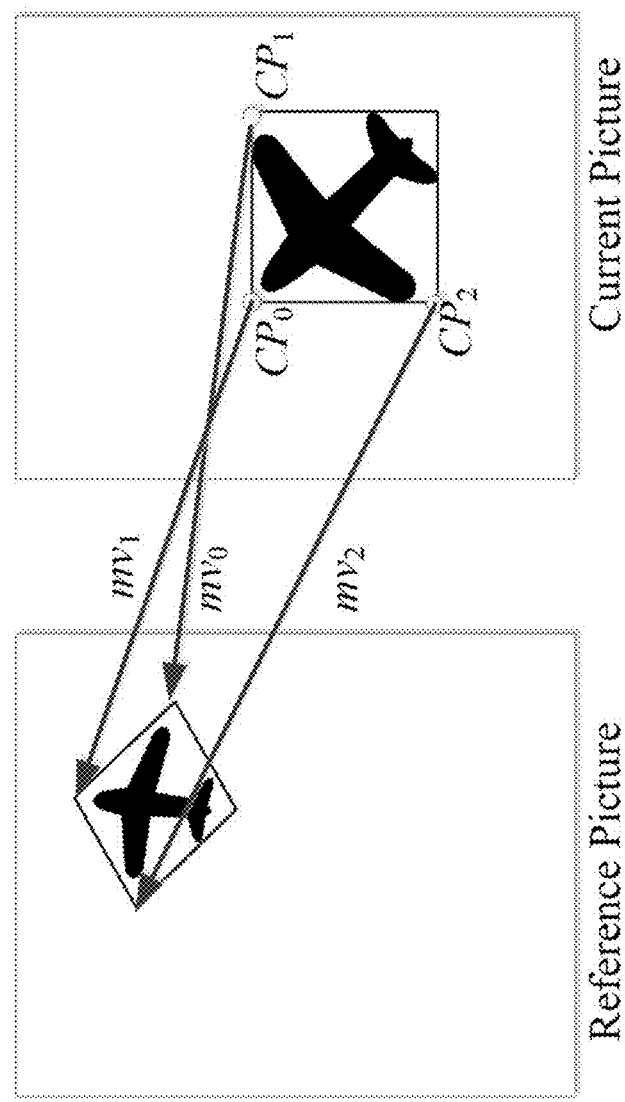

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 13, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 14:
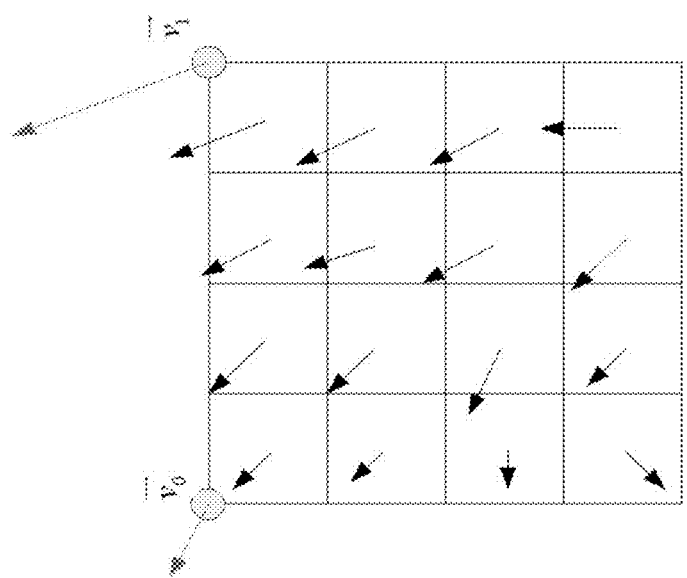
FIG. 14 shows an example of Affine MVF per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 14, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.2.3.1 Signaling of Affine Prediction

Similar to the translational motion model, there are also two modes for signaling the side information due affine prediction. They are AFFINE_INTER and AFFINE_MERGE modes.

2.2.3.2 AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 17) and the estimated CPMVs are signalled. In addition, the index of affine AMVP candidate from which the estimated CPMVs are derived is further signalled.

Inherited Affine Motion Predictors

Figure 16:
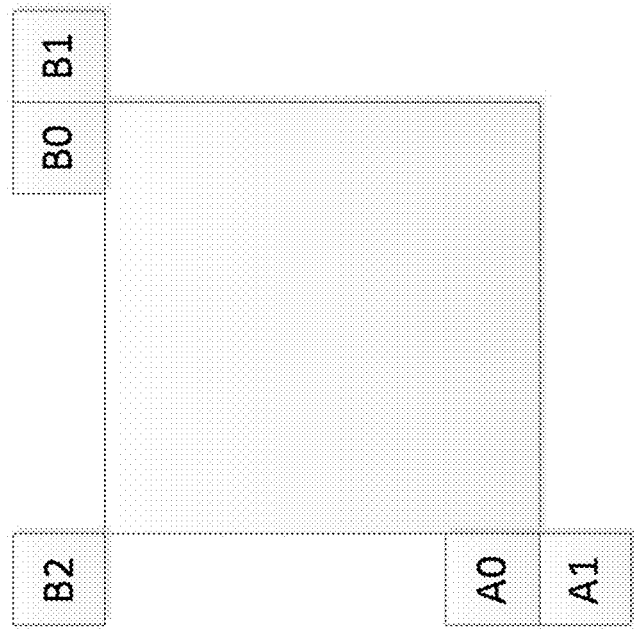
FIG. 16 shows an example of MVP for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 16.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 18 (b) are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

Constructed Affine Motion Predictors

Figure 17:
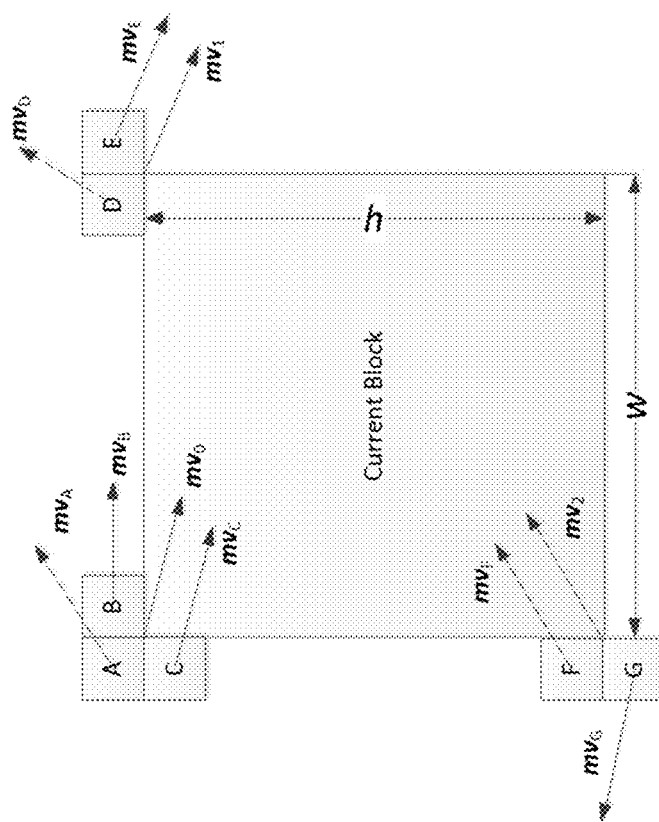
FIG. 17 shows an example of MVP for AF_INTER for constructed affine candidates.

A constructed affine motion predictor consists of control-point motion vectors (CPMVs) that are derived from neighboring inter coded blocks, as shown in FIG. 17, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

Normal AMVP Motion Predictors

The following applies until the number of affine motion predictors reaches the maximum.

Derive an affine motion predictor by setting all CPMVs equal to $\overline{mv}_2$ if available.

Derive an affine motion predictor by setting all CPMVs equal to $\overline{mv}_1$ if available.

Derive an affine motion predictor by setting all CPMVs equal to $\overline{mv}_0$ if available.

Derive an affine motion predictor by setting all CPMVs equal to HEVC TMVP if available.

Derive an affine motion predictor by setting all CPMVs to zero MV. Note that $\overline{mv}_i$ is already derived in constructed affine motion predictor.

In AF_INTER mode, when 4/6-parameter affine mode is used, 2/3 control points are required, and therefore 2/3 MVD needs to be coded for these control points, as shown in FIG. 15. It is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 15 (b). Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.3.3 AF_MERGE Mode

Figure 18:
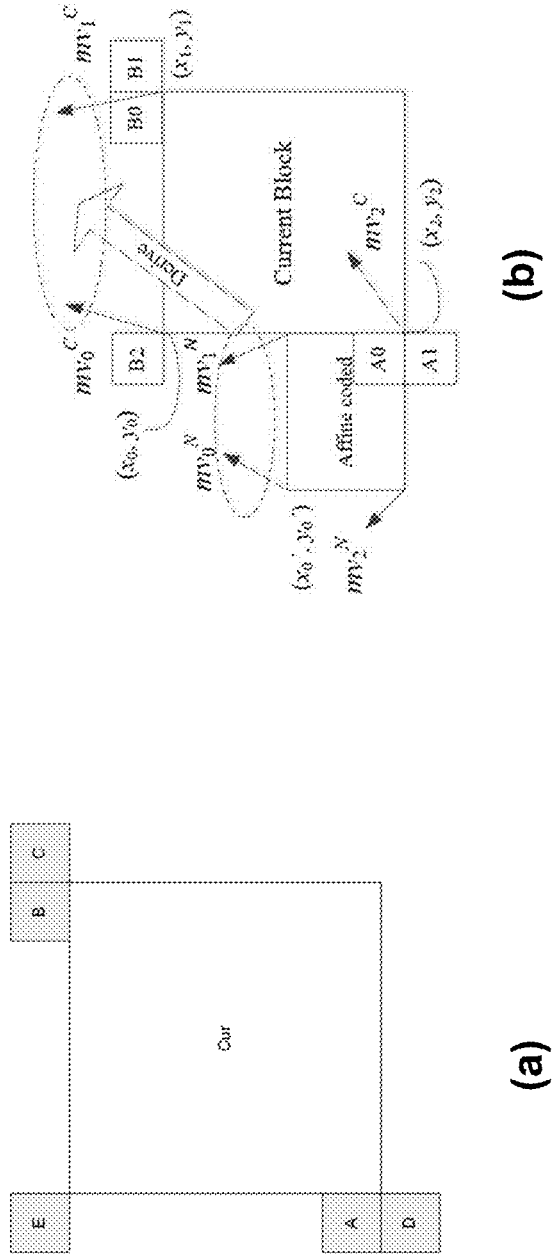
FIG. 18 shows an example of candidates for AF_MERGE.

When a CU is applied in AF_MERGE mode, it gets the first block coded with affine mode from the valid neighbour reconstructed blocks. And the selection order for the candidate block is from left, above, above right, left bottom to above left as shown in FIG. 18 (a) (denoted by A, B, C, D, E in order). For example, if the neighbour left bottom block is coded in affine mode as denoted by A0 in FIG. 18 (b), the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

As an example, an affine merge candidate list is constructed with following steps:

Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

Insert Constructed Affine Candidates

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

Figure 19:
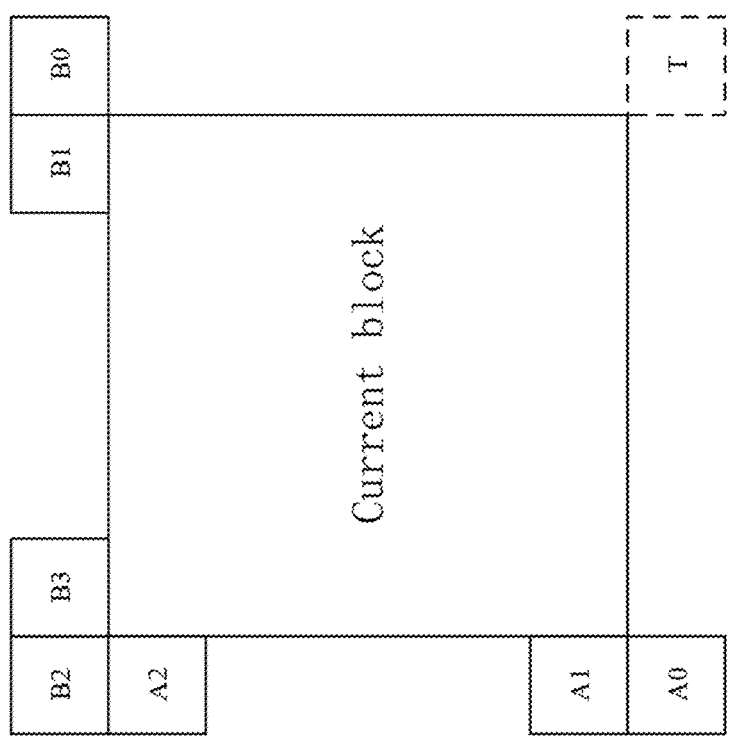
FIG. 19 shows an example of candidate positions for affine merge mode.

The motion information for the control points is derived firstly from the specified spatial neighbors and temporal neighbor shown in FIG. 19. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}

For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.2.4 Current Picture Referencing

Figure 20:
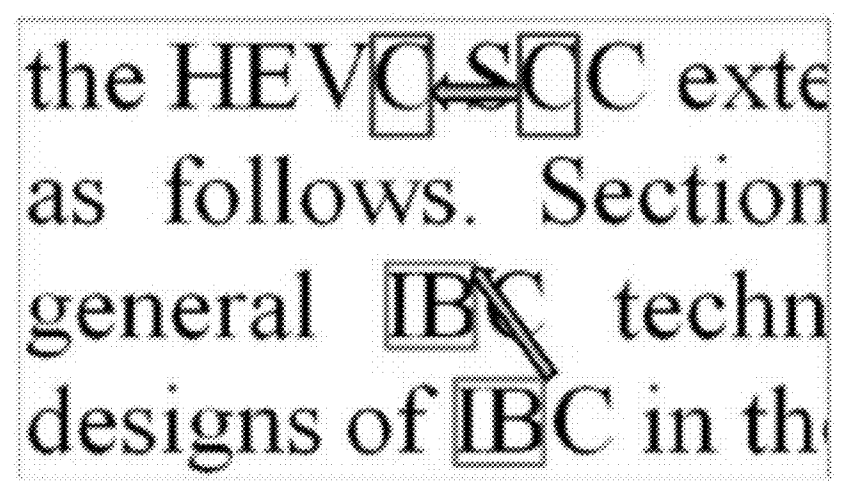

Intra block copy (a.k.a. IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 20.

Similar to the design of CRP in HEVC SCC, In VVC, the use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Main Features:

It is treated as a special inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise an normal inter mode coded one with different pictures as reference pictures.

The motion vector for the IBC mode, also referred as block vector, is coded with integer-pel precision, but stored in memory in $\frac{1}{16}$-pel precision after decoding as quarter-pel precision is required in interpolation and deblocking stages. When used in motion vector prediction for the IBC mode, the stored vector predictor will be right shifted by 4.

Search range: it is restricted to be within the current CTU.

CPR is disallowed when affine mode/triangular mode/GBI/weighted prediction is enabled.

2.2.5 Merge List Design in VVC

There are four different merge list construction processes supported in VVC:

Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. Uni-Prediction TPM merge list size is fixed to be 5.

Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6. MMVD, IBC merge list: it is done in a similar way as the regular merge list.

2.2.5.1 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

The sub-block merge candidate list is filled with candidates in the following order:
  ATMVP candidate (maybe available or unavailable);
  Affine merge lists (including Inherited Affine candidates; and Constructed Affine candidates)
  Padding as zero MV 4-parameter affine model 2.2.5.1.1 ATMVP (aka Sub-Block Temporal Motion Vector Predictor, SbTMVP)

Basic idea of ATMVP is to derive multiple sets of temporal motion vector predictors for one block. Each sub-block is assigned with one set of predictor. When an ATMVP merge candidate is generated, the following process is applied:
  a. Check neighbouring blocks A1 as shown in FIG. 2 in order, to find the first inter-coded, but not CPR-coded block, denoted as block X;
  b. Initialize TMV=(0,0). If there is a MV (denoted as MV') of block X, referring to the collocated reference picture (as signaled in the slice header), TMV is set equal to MV'.
  c. Suppose the center point of the current block is (x0, y0), then locate a corresponding position of (x0,y0) as M=(x0+MV'x, y0+MV'y) in the collocated picture. Find the block Z covering M.
    i. If Z is intra-coded, then ATMVP is unavailable;
    ii. If Z is inter-coded, $MVZ\_0$ and $MVZ\_1$ for the two lists of block Z are scaled to (Reflist 0 index 0) and (Reflist 1 index 0) as MVdefault0, MVdefault1, and stored.
  d. For each 8×8 sub-block, suppose its center point is (x0S, y0S), then locate a corresponding position of (x0S, y0S) as MS=(x0S+MV'x, y0S+MV'y) in the collocated picture. Find the block ZS covering MS.
    i. If ZS is intra-coded, MVdefault0, MVdefault1 are assigned to the sub-block;
    ii. If ZS is inter-coded, $MVZS\_0$ and $MVZS\_1$ for the two lists of block ZS are scaled to (Reflist 0 index 0) and (Reflist 1 index 0) and are assigned to the sub-block;

2.2.5.2 Regular Merge List

Different from the merge list design, in VVC, the history-based motion vector prediction (HMVP) method is employed.

Figure 21:
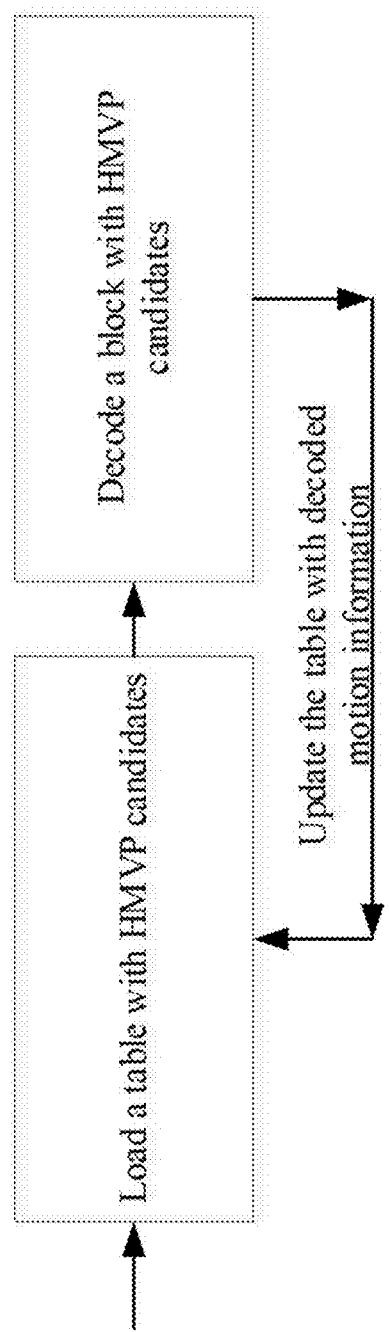
FIG. 21 shows an example of candidate positions for affine merge mode.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 21.

Figure 22:
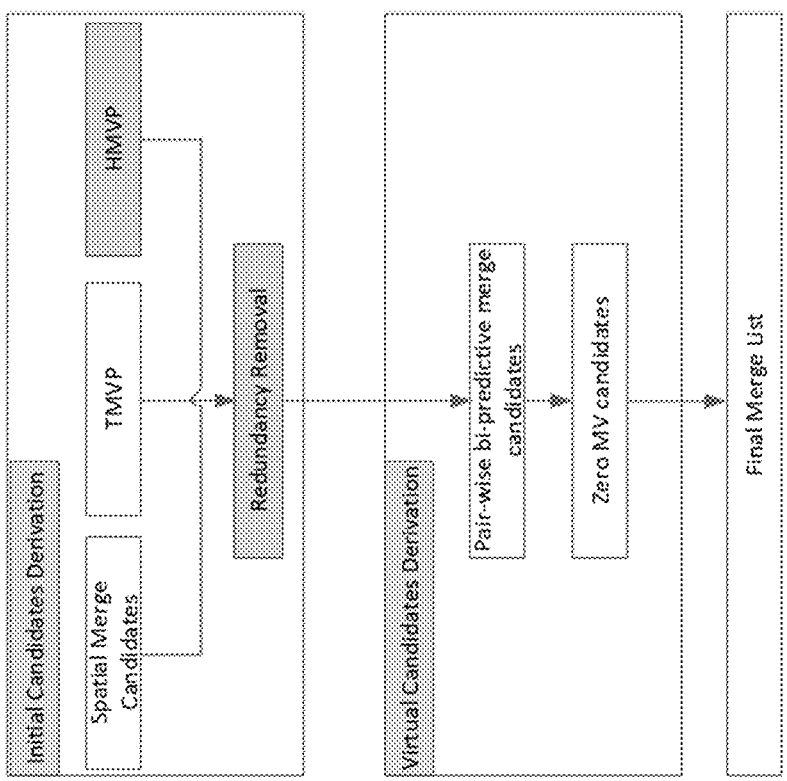
FIG. 22 shows an example of modified merge list construction process.

HMVP candidates could be used in both AMVP and merge candidate list construction processes. FIG. 22 depicts the modified merge candidate list construction process. When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.5.3 IBC Merge List

When IBC is added, HMVP candidates are also applicable for the IBC merge list.

More specifically, another 5 IBC candidates may be stored. In current implementation, the regular and IBC candidates are stored in the same HMVP table. However, they are utilized and updated independently. The first M (M<=5) candidates are for the usage of regular merge/AMVP list; and the remaining N candidates (N<=5) are for the usage of IBC mode. Two counters are maintained to indicate how many regular motion candidates and how many IBC motion candidates in the HMVP table. Therefore, it is equal to use 2 HMVP tables, one is for the regular merge modes, and the other for the IBC mode.

Share same process as in regular MV merge, but disallow TMVP, zero vector means unavailable as it is invalid. It is noted that for a spatial neighboring block, only if it is coded with IBC mode, the associated motion information may be added to the IBC merge list. Meanwhile, for the HMVP part, only the last few HMVP candidates (which are stored IBC motion candidates) may be considered in the IBC merge list.

2.2.6 Shared Merge List

To reduce the decoder complexity and support parallel encoding, it is proposed to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:

If the block has luma samples no larger than 32 (e.g., 8×4 or 4×8), and split to 2 4×4 child blocks, sharing merge lists between very small blocks (e.g. two adjacent 4×4 blocks) is used.

If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to regular merge mode, but not for the TPM and IBC modes.

2.2.6.1 HMVP Table Updating and Usage for a Child Block Under the Merge Sharing Node A temporary HMVP table is allocated. Before, the original HMVP table must be copied to the temporary HMVP table before entering the first CU of one shared region.

Figure 23:
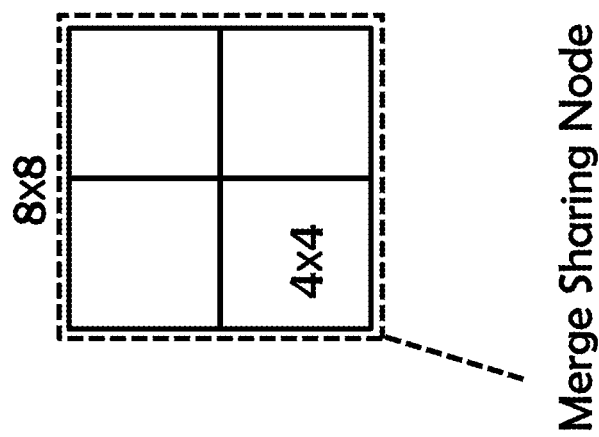
FIG. 23 shows an example a merge sharing node.

In the example shown in FIG. 23: example of merge sharing mode, one 8×8 is QT partitioned into 4 4×4 CUs. Before doing the first CU (e.g., the left-top 4×4 CU), the history list must be copied into the temporary HMVP table (HmvpCandListShared[ ]), and, for each 4×4 inside the shared parent (merge sharing node in the figure), if it is coded with regular merge mode, it need the history list for merge mode and it uses motion candidates in the temporary HMVP table.

However, after decoding one 4×4 CU, if it is merge or AMVP or IBC mode, the original HMVP table is updated accordingly. That is, for each 4×4 inside the shared parent (merge sharing node in the figure), if it is coded with non-regular merge mode, such as AMVP mode, it need the history list for the AMVP mode and it uses motion candidates in the original HMVP table which may include motion information of other child blocks under the same merge sharing node.

3. Examples of Problems Solved by Embodiments

The current design of sharing merge list has the following problems:

The shared merge list is only applicable to regular merge mode. If one block is coded with IBC mode, it may still use its neighboring blocks' motion information which is conflict with the concept of shared merge list.

For smaller blocks, if same cross-component linear model (CCLM)/localize illumination compensation (LIC) is enabled, they rely on the neighbouring reconstructed samples of a child block to code the other child block. Such a design decreases the pipeline throughput.

Two HMVP tables are needed, one is the original HMVP table (which includes both motion candidates for regular and IBC modes), one is the temporary HMVP table which is used for coding the sharing merge list. The cache memory size is doubled.

If the shared merge list is applied to all kinds of modes, for one merge sharing node, multiple shared merge lists may need to be constructed and each one is corresponding to one given mode (such as regular merge mode, TPM, IBC etc. al). Such a design is still very complex.

4. Examples of Embodiments

The detailed techniques below should be considered as examples to explain general concepts. These techniques should not be interpreted in a narrow way. Furthermore, these techniques can be combined in any manner.

1. All of the child blocks under a IBC merge sharing node may share the same IBC merge candidate list.
    a. In one example, any of the child blocks, if coded with IBC merge mode, it uses the same IBC merge candidate list constructed for the IBC merge sharing node.
    b. In one example, the motion information of a child block is disallowed to be added in the IBC merge candidate list of another child block under the same motion sharing node.
    c. In one example, the IBC merge candidate list is constructed for the sharing node block as a whole, and the IBC merge candidate list is shared by all the child blocks split from the sharing node block.
    d. In one example, two HMVP tables may be maintained, one global and one temporary.
        i. Before decoding the first child block under the motion sharing node, the global HMVP table is copied to the temporary HMVP table.
        ii. The motion information of a child block under the same motion sharing node may be utilized to update the global HMVP table, but disallowed to update the temporary HMVP table.
        iii. The motion candidates in the temporary HMVP table may be used to construct the IBC merge candidate list, however, those in the global HMVP table are disallowed.
        iv. For blocks which are not under the motion sharing node (such as blocks with size equal to 8×16), the motion candidates in the global HMVP table may be used to construct the IBC merge candidate list and the decoded motion information of these blocks may be used to update the global HMVP table.
2. All of the child blocks under a motion sharing node may share the same motion candidate list such as the AMVP candidate list, TPM candidate list.
    a) In one example, the shared candidate list is constructed for the sharing node block as a whole.
    b) In one example, for such a motion candidate list construction process, the motion information of any of these child blocks is disallowed to be considered in the motion candidate list.
    c) Such methods may be also applicable to IBC modes, such as IBC AMVP candidate list, IBC TPM candidate list.
2. All of the child blocks under a parameter sharing node may share the same cross-component linear model (CCLM)/localize illumination compensation (LIC) parameters or other parameters derived at the decoder side.
    a) In one example, the shared parameters are derived for the sharing node block as a whole.
    b) In one example, the reconstruction samples of any one block of these child blocks are disallowed to be utilized in the parameter derivation process for another block of these child blocks.
    c) In one example, the reference samples of any one block of these child blocks are disallowed to be utilized in the parameter derivation process for another block of these child blocks.
3. It is proposed to disallow adding motion candidates derived from HMVP tables for the shared merge/AMVP candidate list when coding/decoding a child block under the motion/merge/IBC merging sharing node.
    a) In one example, the shared merge/AMVP candidate list contains no HMVP candidates.
    b) In one example, the checking/adding motion candidates from HMVP tables is disallowed when meeting a motion/merge/IBC merging sharing node.
    c)
4. For above bullets, the IBC merge sharing node/the motion sharing node and/or the parameter sharing node may be defined to be the same as the merge sharing node utilized for the regular merge mode.
    a) In one example, if the number of luma samples within the block no larger than (or smaller than) a threshold and it is further split, such a block is called IBC merge sharing node/motion sharing node and/or the parameter sharing node.
    b) If the number of luma samples within the block is larger than a threshold, however, after a split, at least one child block is smaller than the threshold, such a block is called IBC merge sharing node/motion sharing node and/or the parameter sharing node.
    c) In one example, the threshold is defined as 32, or 64, or 128.
    d) Alternatively, if one block is split to multiple child blocks and at least one child block's width equal to M, and/or at least one child block's height equal to N, such block is called IBC merge sharing node/motion sharing node and/or the parameter sharing node. In one example, M and N are both set to 4.
  e) Alternatively, different thresholds/M and N settings/definitions of IBC merge sharing node and/or motion sharing node and/or the parameter sharing node may be used.
5. Refined motion information due to DMVD technologies (e.g., DMVR) are disallowed to update the HMVP tables.
6. It is proposed to disable DMVD processes for a motion candidate derived from the HMVP tables.
  a) In one example, if a merge candidate is one directly copied from the HMVP table, DMVD process is skipped.
  b) In one example, if a merge candidate is generated with motion candidates in the HMVP table, such as pair-wise bi-predictive candidates derived from at least one candidate in the HMVP table, DMVD process is skipped.
  c) Alternatively, furthermore, refined motion information of one block due to DMVD processes may be utilized to update the HMVP tables.
7. It is proposed to disable the HMVP table updating process for all of the child blocks under the merge/motion/IBC merge/parameter sharing node. In this case, the temporary HMVP table is totally removed.
  a) In one example, the HMVP table is kept unchanged before encoding/decoding the first child block under the sharing node and after encoding/decoding the last child block under the sharing node.
  b) Alternatively, HMTP table updating process may be enabled only for a certain child block, such as the last block in encoding/decoding order.
  c) Alternatively, the motion information of all child blocks may be firstly stored, and one or more multiple representative motion information may be utilized to update the HMVP table.
8. How to update the HMVP table after coding a block using the shared merge/motion list may depend on the coded mode information.
  a) In one example, the coded mode information includes regular merge mode and IBC mode.
9. A conformance bitstream shall satisfy that when a merge/IBC merge/motion sharing node is found, all the merge-coded child blocks share the same mode.
  a) In one example, if a child block is coded with regular merge mode, all the child blocks should be coded with the regular merge mode.
  b) In one example, all the child blocks, if a child block is coded with TPM mode, all the child blocks should be coded with the TPM.
  c) In one example, all the child blocks, if a child block is coded with IBC merge mode, all the child blocks should be coded with the IBC mode.
10. It is proposed that when a merge sharing node is found, all the child blocks share the same merge list and same motion candidate in the list.
  a) In one example, the selected motion candidate index may be only coded once for all child blocks.
    i. In one example, the selected motion candidate index may be only coded for the first merge-coded child block in the encoding/decoding order.
  b) Alternatively, multiple motion candidate indices may still be coded as in the current design, however, a conformance bitstream shall satisfy that all of them are restricted to be the same.
11. It is proposed that when a merge sharing node is found, all the child blocks share the same merge list and same motion candidate in the list for one specific mode type (such as regular merge mode, IBC merge mode, triangular mode).
  a) In one example, the selected mode index may be only coded once for all child blocks.
    i. In one example, the selected mode index may be only coded for the first merge-coded child block in the encoding/decoding order.
  b) Alternatively, multiple mode indices may still be coded as in the current design, however, a conformance bitstream shall satisfy that all of them are restricted to be the same.
  c) Alternatively, only one specific merge mode type may be allowed, such as the regular merge mode.
    i. In this case, the signalling of other kinds of mode types (such as TPM, IBC mode) may be skipped.
12. It is proposed that the candidate list construction process is different for a regular block and for a merge/motion/IBC merging sharing node block.
  a) In one example, more candidates may be put into the merge list for a sharing node block.
  b) In one example, different relative positions of spatial neighbouring blocks/temporal blocks may be accessed to get merge candidates for a sharing node block.
  c) In one example, whether to add motion candidates and/or how to add motion candidates from HMVP tables may depend on whether it is a sharing node block.
  d) In one example, more spatial neighbouring blocks may be accessed to get merge candidates for a sharing node block.
  e) In one example, more temporal neighbouring blocks may be accessed to get merge candidates for a sharing node block.

Figure 24:
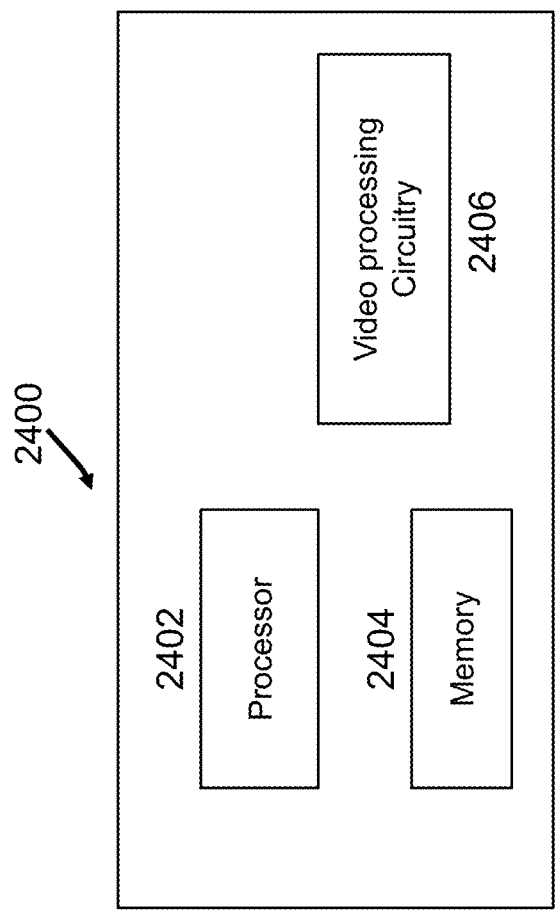
FIG. 24 is a block diagram of an example of a video processing apparatus.

FIG. 24 is a block diagram of a video processing apparatus 2400. The apparatus 2400 may be used to implement one or more of the methods described herein. The apparatus 2400 may be embodied in a smartphone, tablet, computer, Internet of Things (IoT) receiver, and so on. The apparatus 2400 may include one or more processors 2402, one or more memories 2404 and video processing hardware 2406. The processor(s) 2402 may be configured to implement one or more methods described in the present document. The memory (memories) 2404 may be used for storing data and code used for implementing the methods and techniques described herein. The video processing hardware 2406 may be used to implement, in hardware circuitry, some techniques described in the present document.

Figure 26:
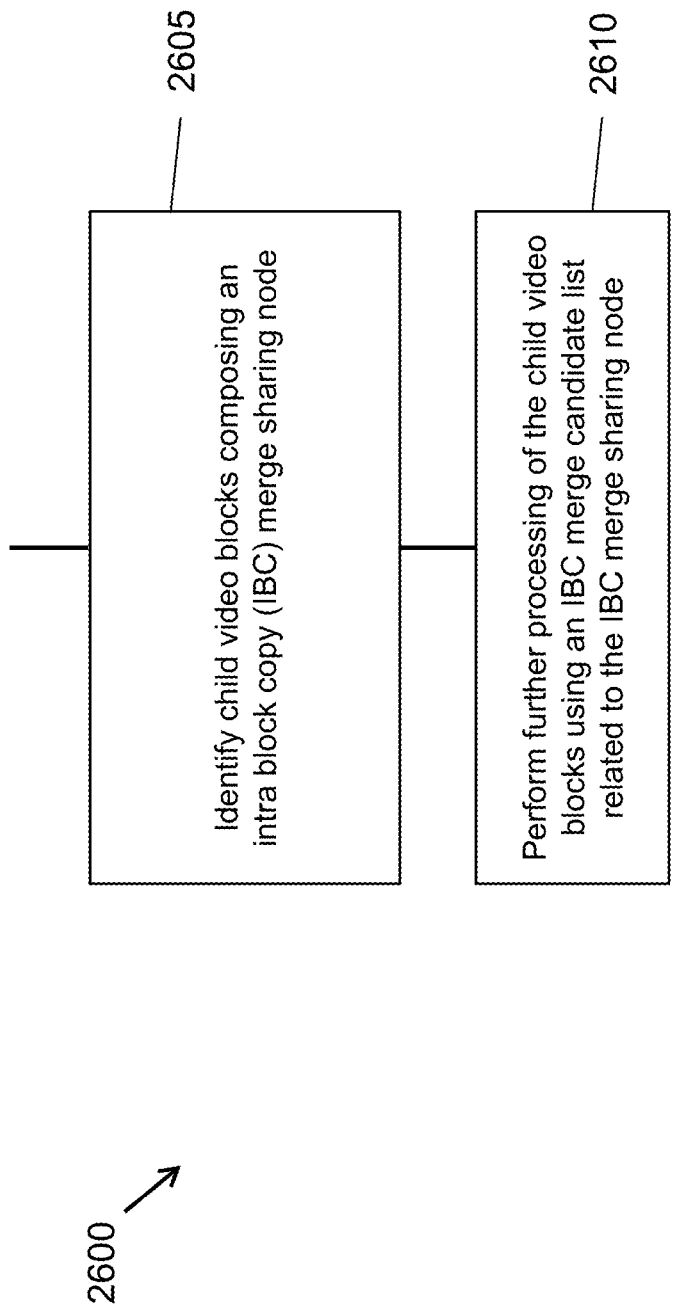
FIG. 26 is a flowchart for an example of a video processing method.

FIG. 26 is a flowchart for a method 2600 of processing a video. The method 2600 includes identifying (2605) child video blocks composing an intra block copy (IBC) merge sharing node, and performing (2610) further processing of the child video blocks using an IBC merge candidate list related to the IBC merge sharing node.

Figure 27:
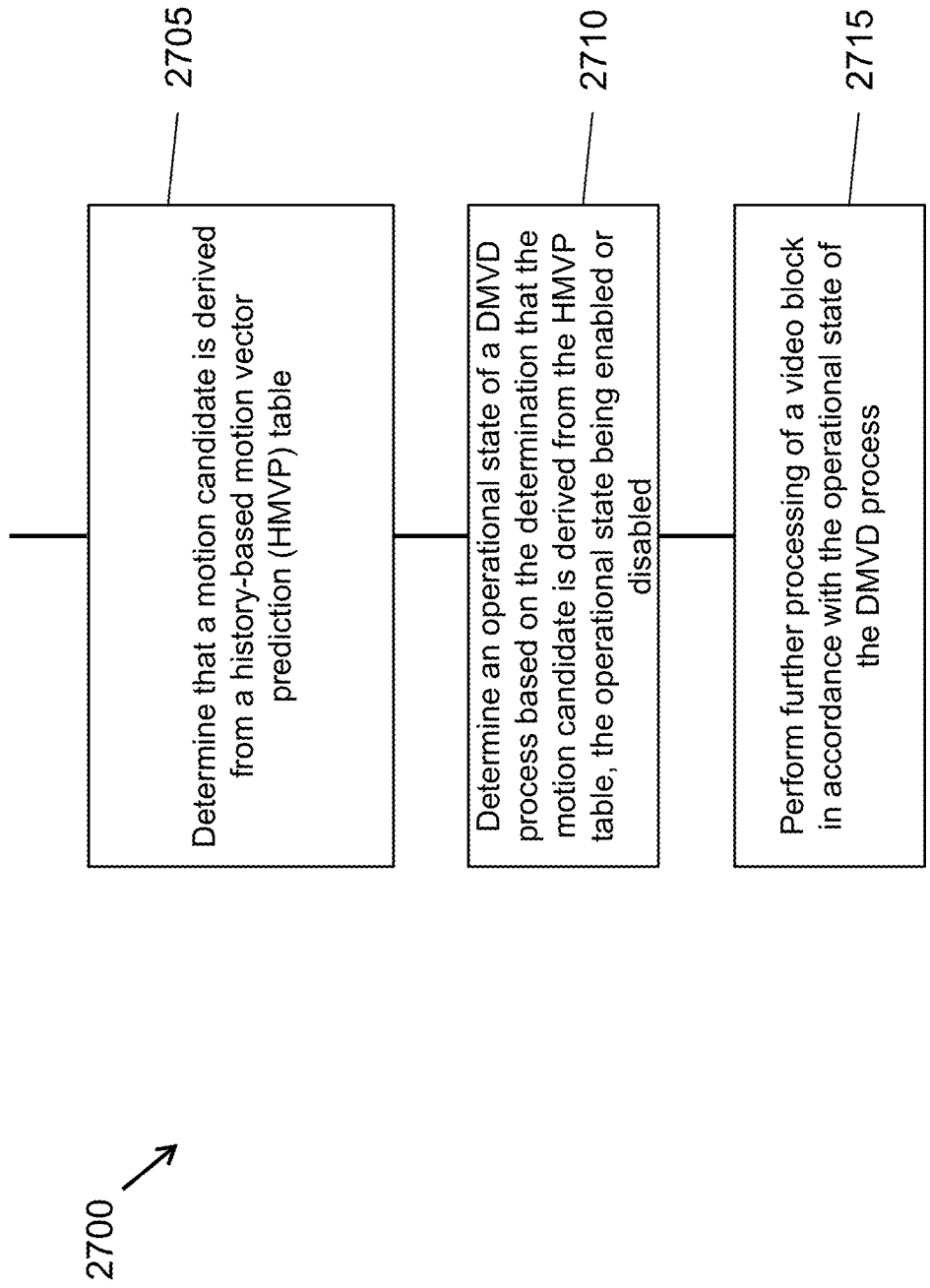
FIG. 27 is a flowchart for an example of a video processing method.

FIG. 27 is a flowchart for a method 2700 of processing video. The method 2700 includes determining (2705) that a motion candidate is derived from a history-based motion vector prediction (HMVP) table, determining (2710) an operational state of a DMVD process based on the determination that the motion candidate is derived from the HMVP table, the operational state being enabled or disabled, and performing (2715) further processing of a video block in accordance with the operational state of the DMVD process.

Figure 28:
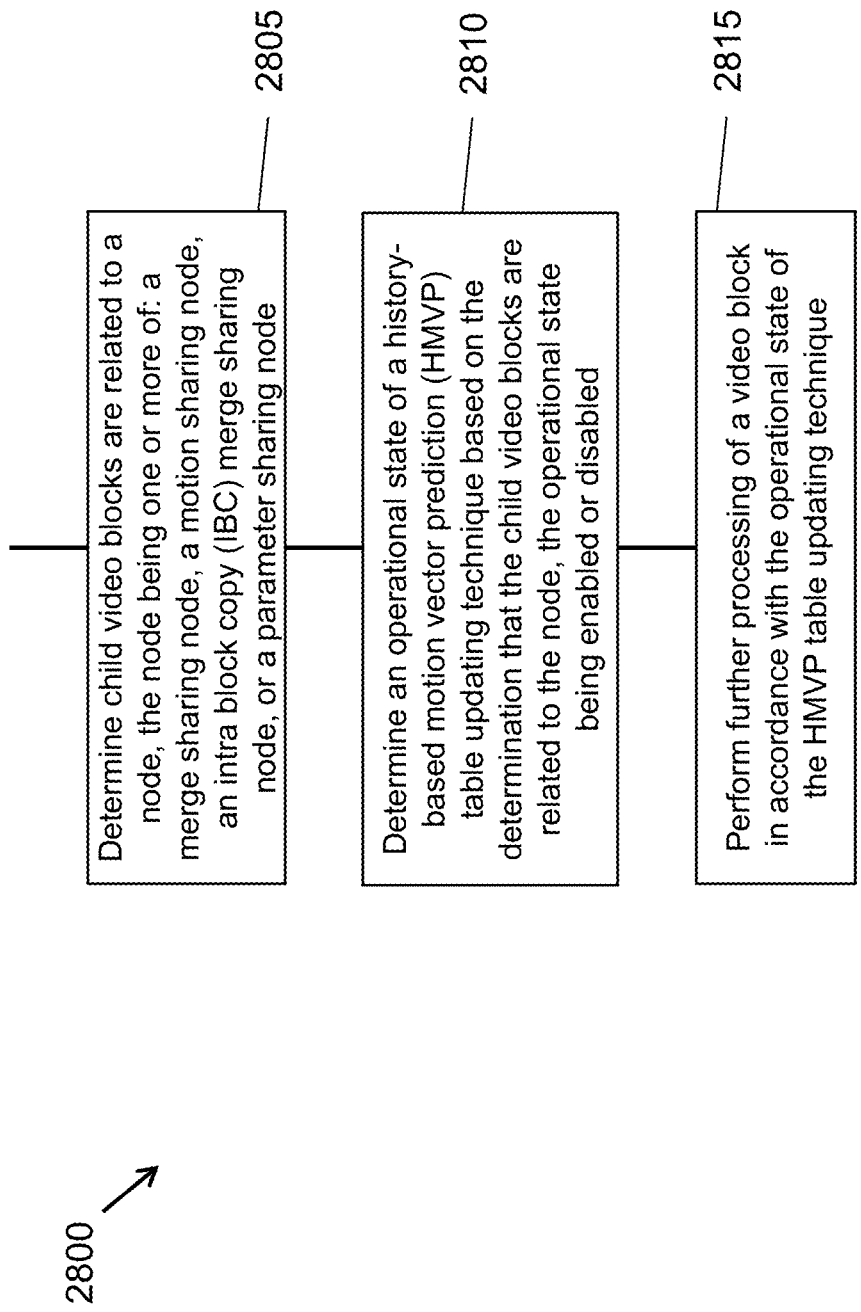
FIG. 28 is a flowchart for an example of a video processing method.

FIG. 28 is a flowchart for a method 2800 of processing video. The method 2800 includes determining (2805) child video blocks are related to a node, the node being one or more of: a merge sharing node, a motion sharing node, an intra block copy (IBC) merge sharing node, or a parameter sharing node, determining (2810) an operational state of a history-based motion vector prediction (HMVP) table updating technique based on the determination that the child video blocks are related to the node, the operational state being enabled or disabled, and performing (2815) further processing of a video block in accordance with the operational state of the HMVP table updating technique.

Figure 29:
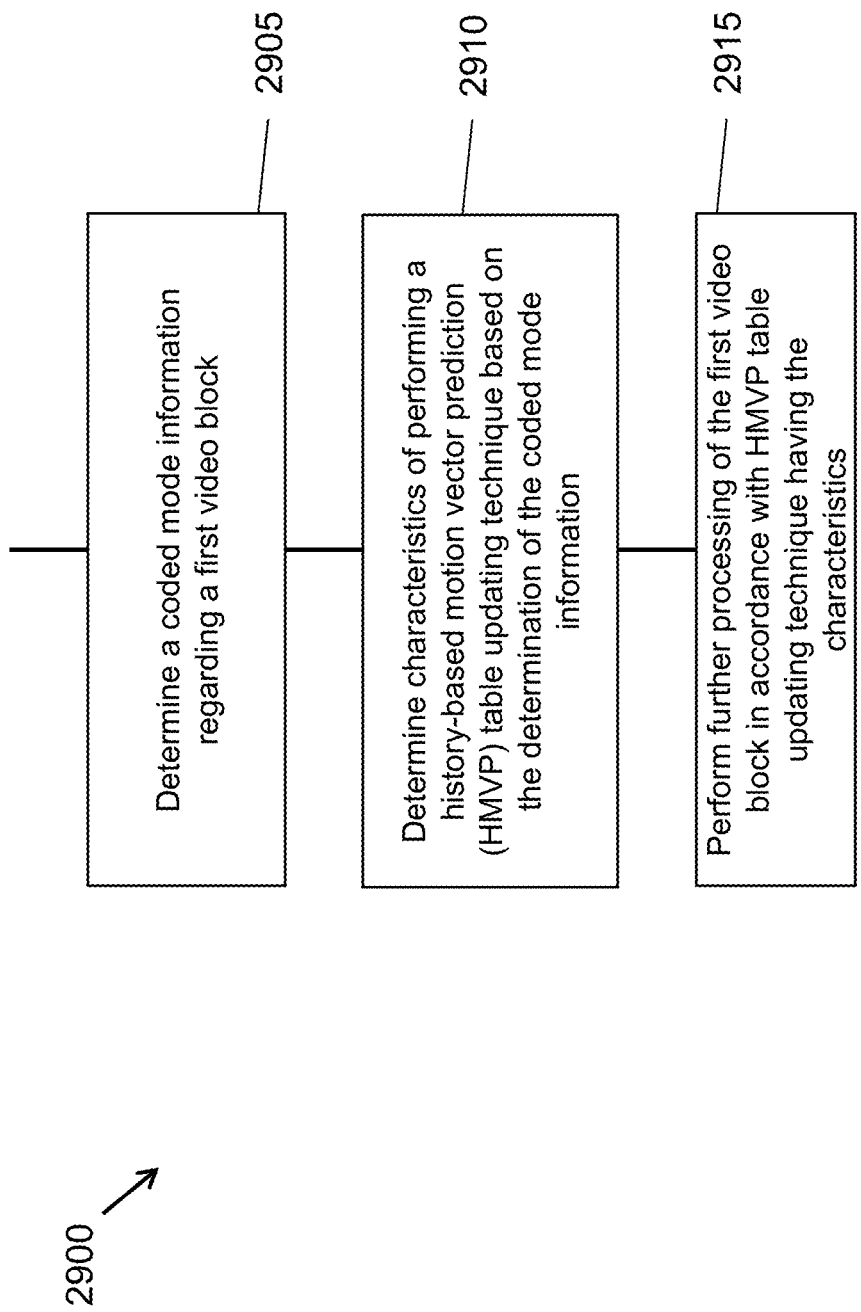
FIG. 29 is a flowchart for an example of a video processing method.

FIG. 29 is a flowchart for a method 2900 of processing video. The method 2900 includes determining (2905) a coded mode information regarding a first video block, determining (2910) characteristics of performing a history-based motion vector prediction (HMVP) table updating technique based on the determination of the coded mode information, and performing (2915) further processing of the first video block in accordance with HMVP table updating technique having the characteristics.

Figure 30:
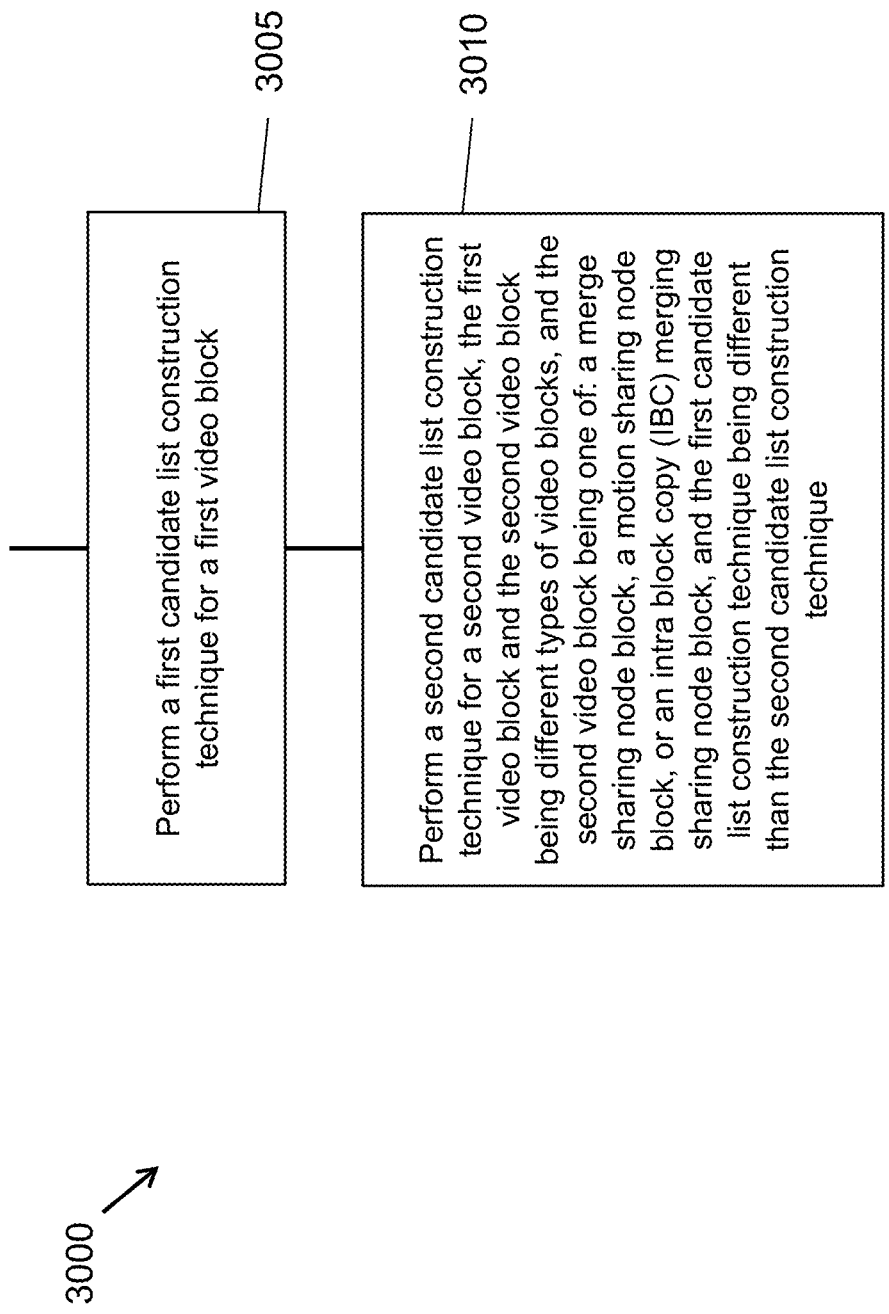
FIG. 30 is a flowchart for an example of a video processing method.

FIG. 30 is a flowchart for a method 3000 of processing a video. The method 3000 includes performing (3005) a first candidate list construction technique for a first video block, and performing (3010) a second candidate list construction technique for a second video block, the first video block and the second video block being different types of video blocks, and the second video block being one of: a merge sharing node block, a motion sharing node block, or an intra block copy (IBC) merging sharing node block, and the first candidate list construction technique being different than the second candidate list construction technique.

Figure 31:
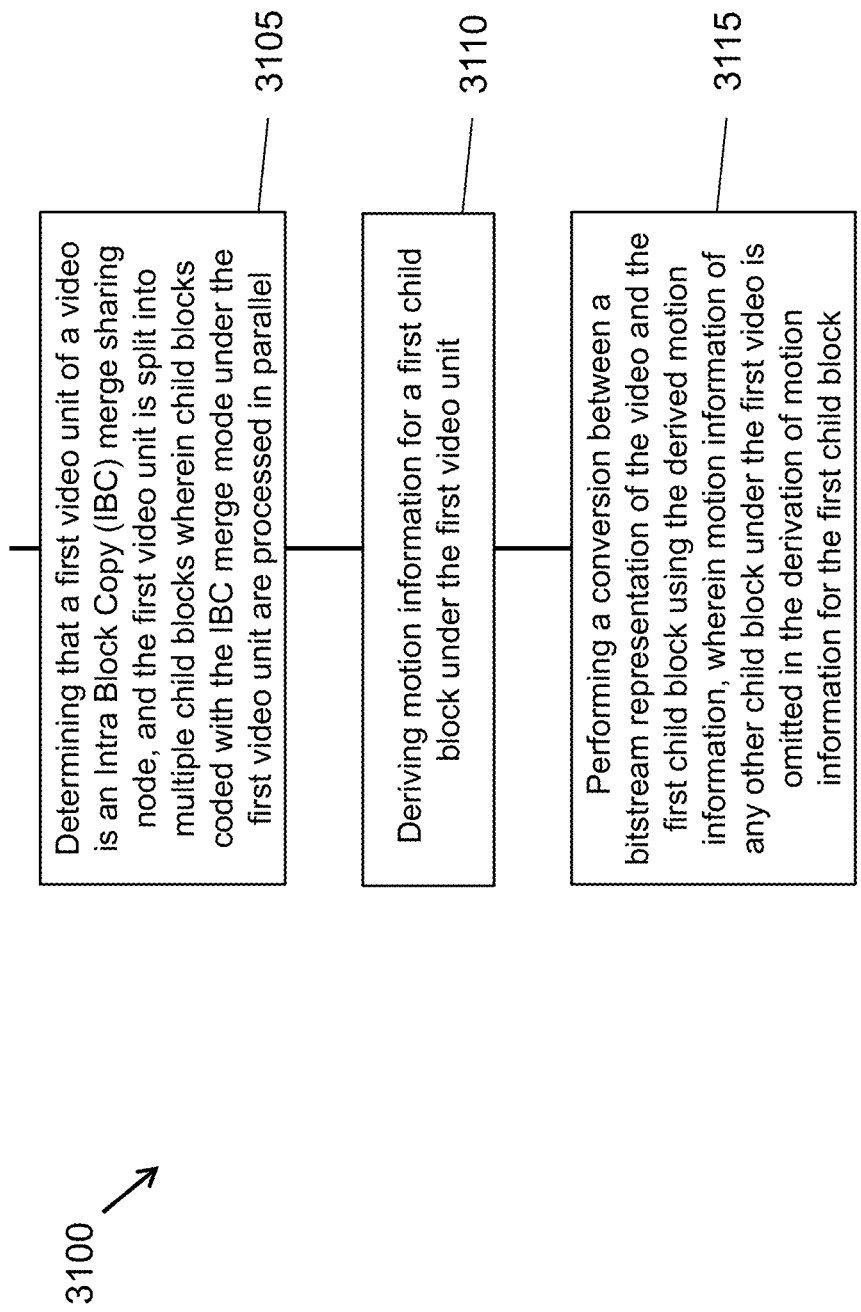
FIG. 31 is a flowchart for an example of a video processing method.

FIG. 31 is a flowchart for a method 3100 of processing a video. The method 3100 includes determining (3105) that a first video unit of a video is an Intra Block Copy (IBC) merge sharing node, and the first video unit is split into multiple child blocks wherein child blocks coded with the IBC merge mode under the first video unit are processed in parallel; deriving (3110) motion information for a first child block under the first video unit; and performing (3115) a conversion between a bitstream representation of the video and the first child block using the derived motion information, wherein motion information of any other child block under the first video is omitted in the derivation of motion information for the first child block.

Figure 32:
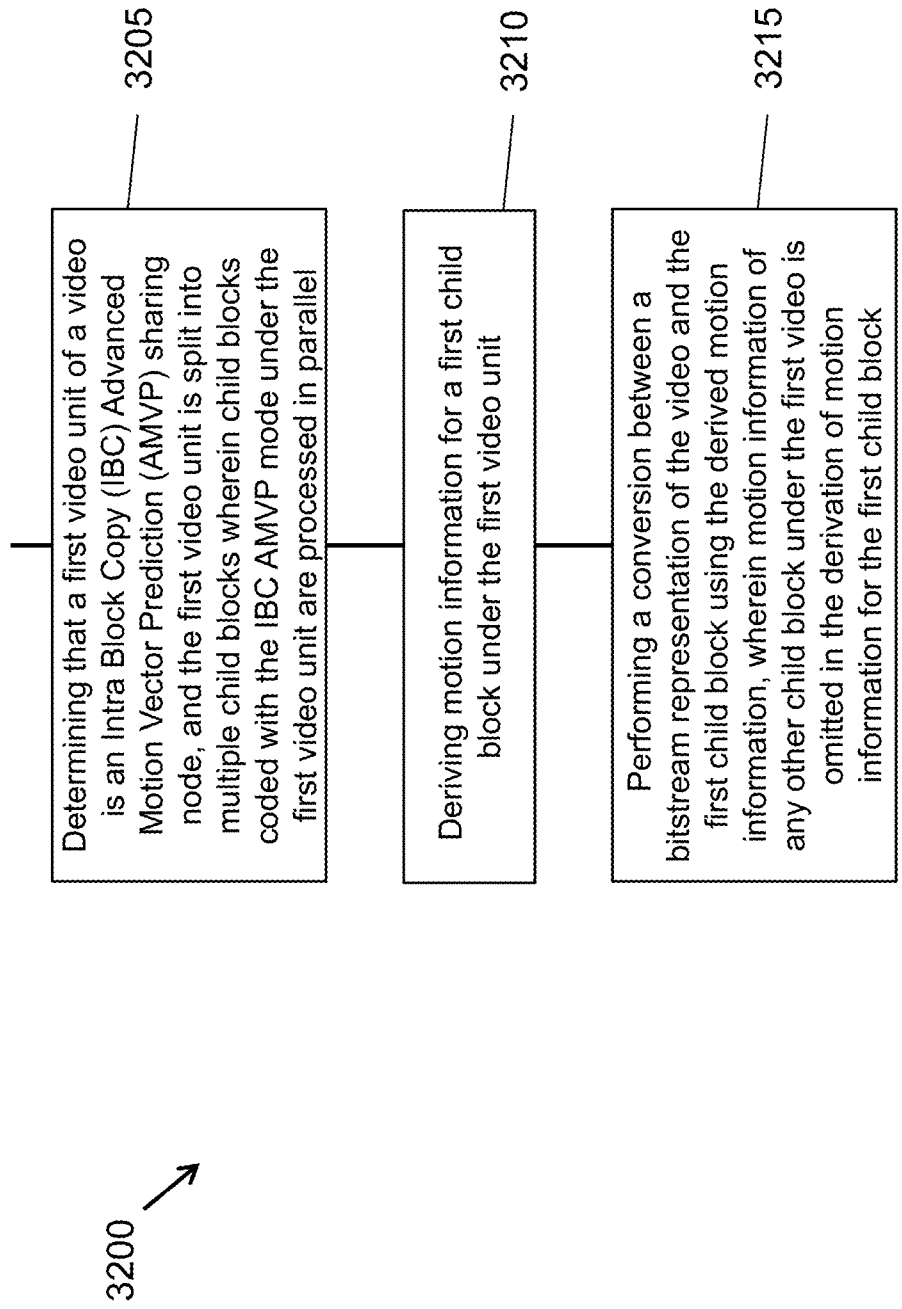
FIG. 32 is a flowchart for an example of a video processing method.

FIG. 32 is a flowchart for a method 3200 of processing a video. The method 3200 includes determining (3205) that a first video unit of a video is an Intra Block Copy (IBC) Advanced Motion Vector Prediction (AMVP) sharing node, and the first video unit is split into multiple child blocks wherein child blocks coded with the IBC AMVP mode under the first video unit are processed in parallel; deriving (3210) motion information for a first child block under the first video unit; and performing (3215) a conversion between a bitstream representation of the video and the first child block using the derived motion information, wherein motion information of any other child block under the first video is omitted in the derivation of motion information for the first child block.

Figure 33:
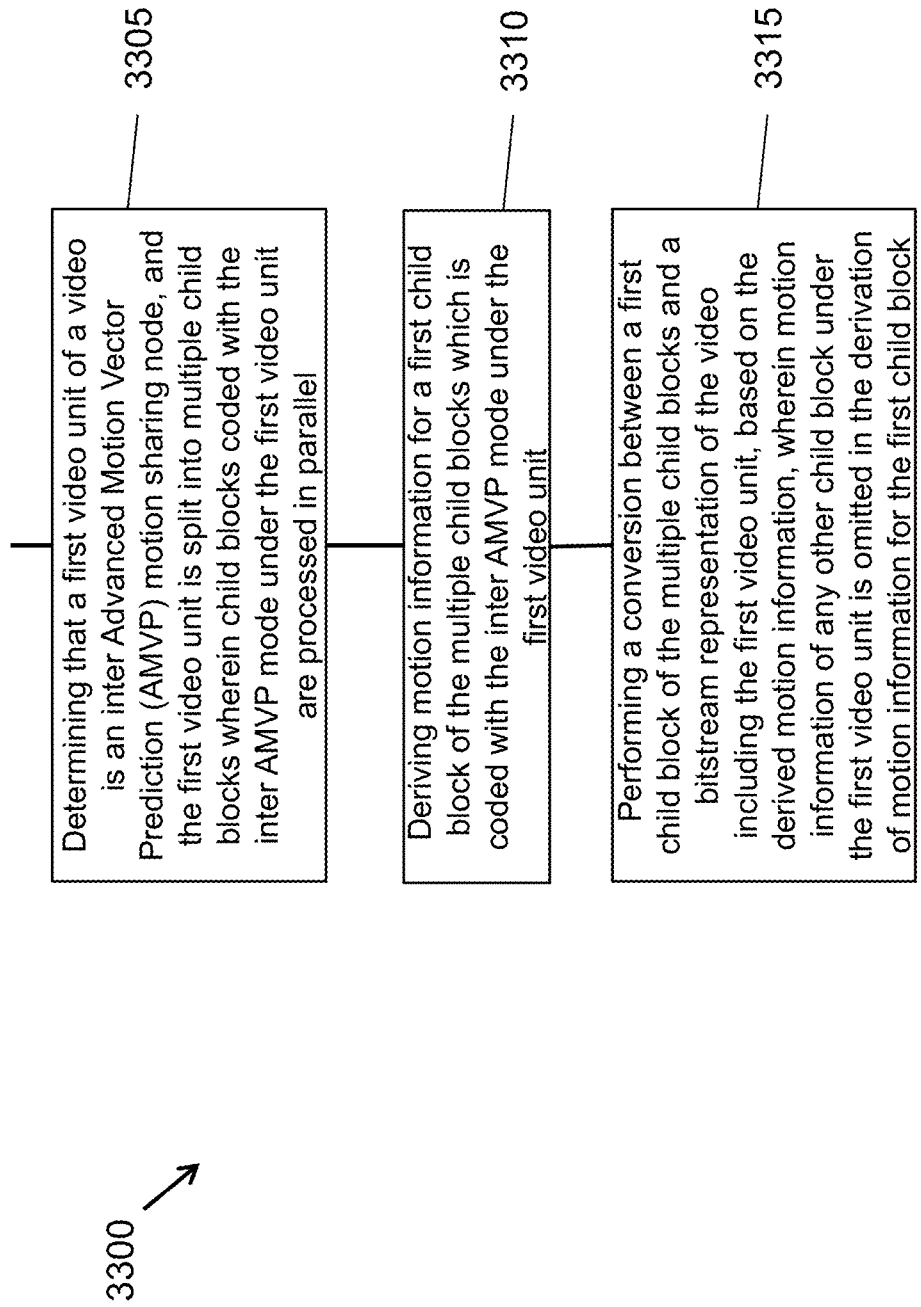
FIG. 33 is a flowchart for an example of a video processing method.

FIG. 33 is a flowchart for a method 3300 of processing a video. The method 3300 includes determining (3305) that a first video unit of a video is an inter Advanced Motion Vector Prediction (AMVP) motion sharing node, and the first video unit is split into multiple child blocks wherein child blocks coded with the inter AMVP mode under the first video unit are processed in parallel; deriving (3310) motion information for a first child block of the multiple child blocks which is coded with the inter AMVP mode under the first video unit; and performing (3315) a conversion between a first child block of the multiple child blocks and a bitstream representation of the video including the first video unit, based on the derived motion information, wherein motion information of any other child block under the first video unit is omitted in the derivation of motion information for the first child block.

Figure 34:
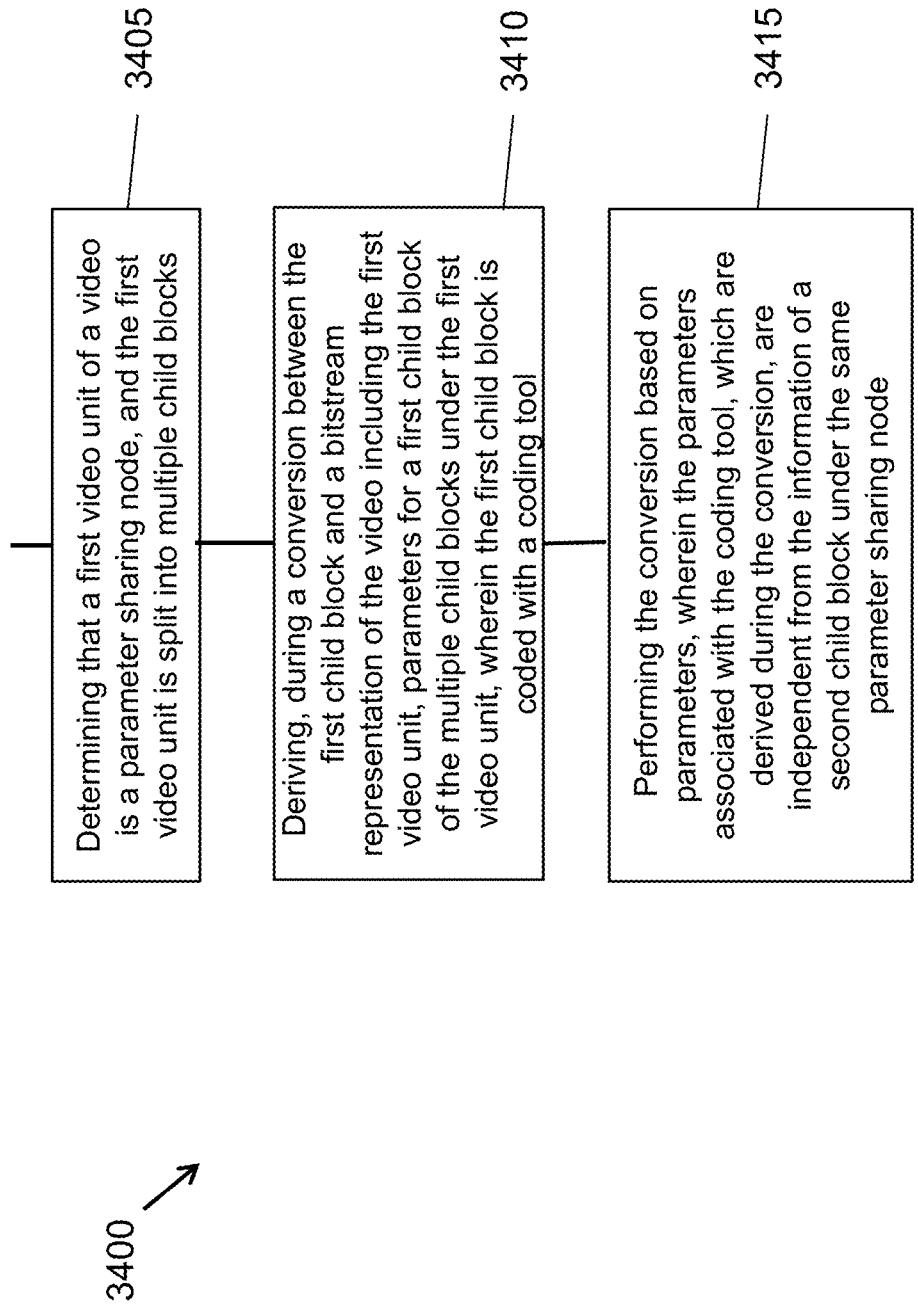
FIG. 34 is a flowchart for an example of a video processing method.

FIG. 34 is a flowchart for a method 3400 of processing a video. The method 3400 includes determining (3405) that a first video unit of a video is a parameter sharing node, and the first video unit is split into multiple child blocks; deriving (3410), during a conversion between the first child block and a bitstream representation of the video including the first video unit, parameters for a first child block of the multiple child blocks under the first video unit, wherein the first child block is coded with a coding tool; and performing (3415) the conversion based on parameters, wherein the parameters associated with the coding tool, which are derived during the conversion, are independent from the information of a second child block under the same parameter sharing node.

Figure 35:
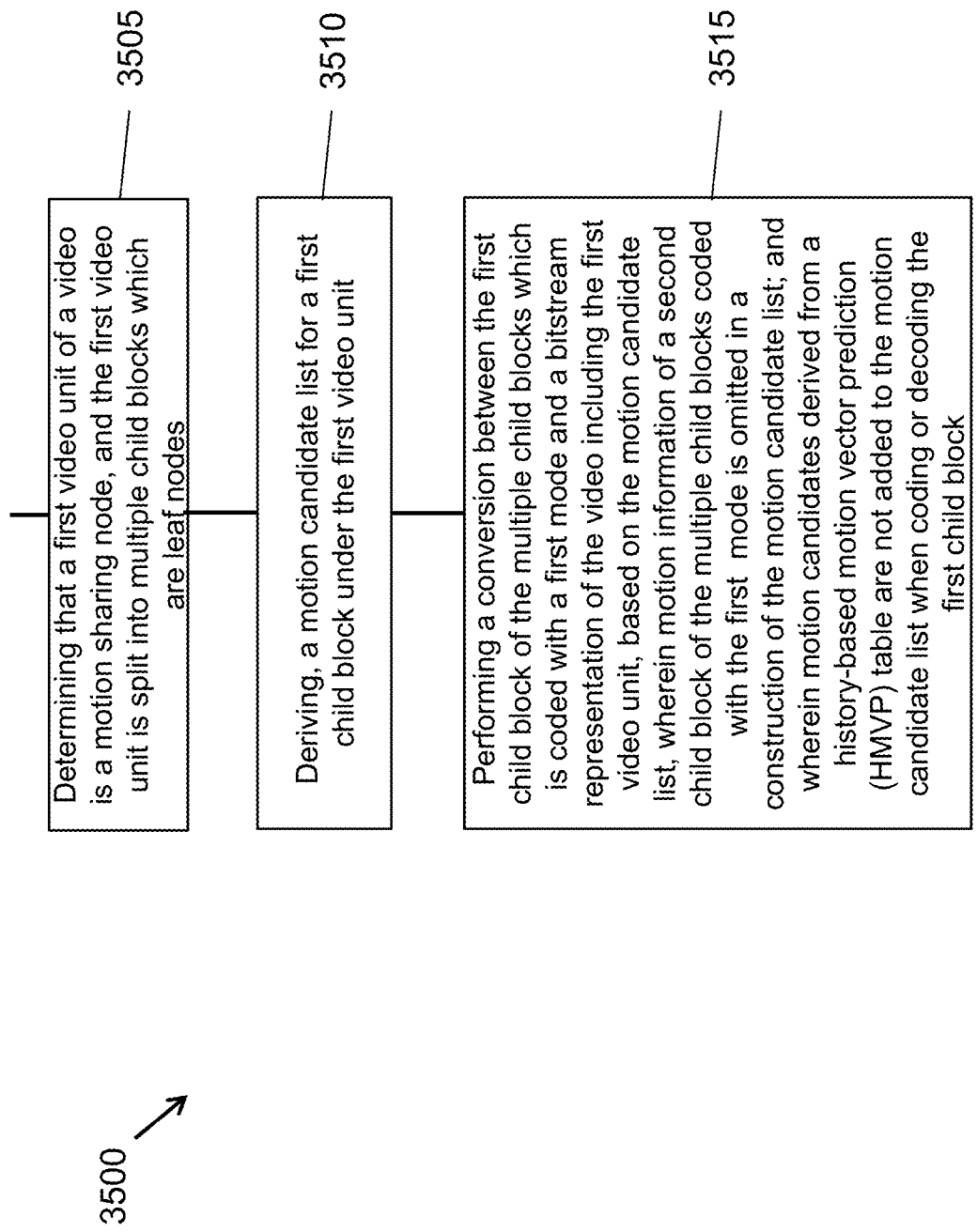
FIG. 35 is a flowchart for an example of a video processing method.

FIG. 35 is a flowchart for a method 3500 of processing a video. The method 3500 includes determining (3505) that a first video unit of a video is a motion sharing node, and the first video unit is split into multiple child blocks which are leaf nodes; deriving (3510) a motion candidate list for a first child block under the first video unit; and performing (3515) a conversion between the first child block of the multiple child blocks which is coded with a first mode and a bitstream representation of the video including the first video unit, based on the motion candidate list, wherein motion information of a second child block of the multiple child blocks coded with the first mode is omitted in a construction of the motion candidate list, and wherein motion candidates derived from a history-based motion vector prediction (HMVP) table are not added to the motion candidate list when coding or decoding the first child block.

Figure 36:
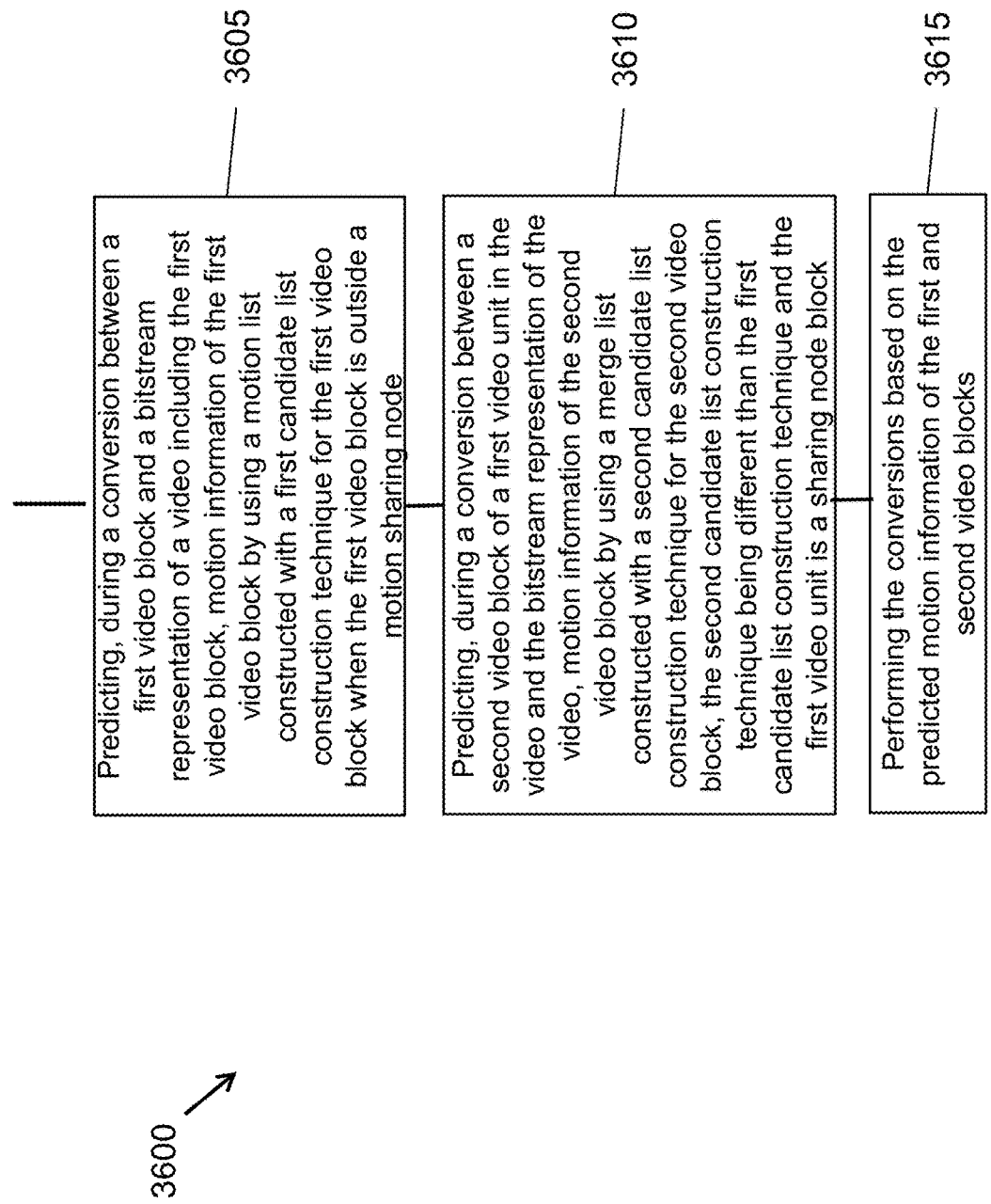
FIG. 36 is a flowchart for an example of a video processing method.

FIG. 36 is a flowchart for a method 3600 of processing a video. The method 3600 includes predicting (3605), during a conversion between a first video block and a bitstream representation of a video including the first video block, motion information of the first video block by using a motion list constructed with a first candidate list construction technique for the first video block when the first video block is outside a motion sharing node; predicting (3610), during a conversion between a second video block of a first video unit in the video and the bitstream representation of the video, motion information of the second video block by using a merge list constructed with a second candidate list construction technique for the second video block, the second candidate list construction technique being different than the first candidate list construction technique and the first video unit is a sharing node block; and performing (3615) the conversions based on the predicted motion information of the first and second video blocks.

Figure 37:
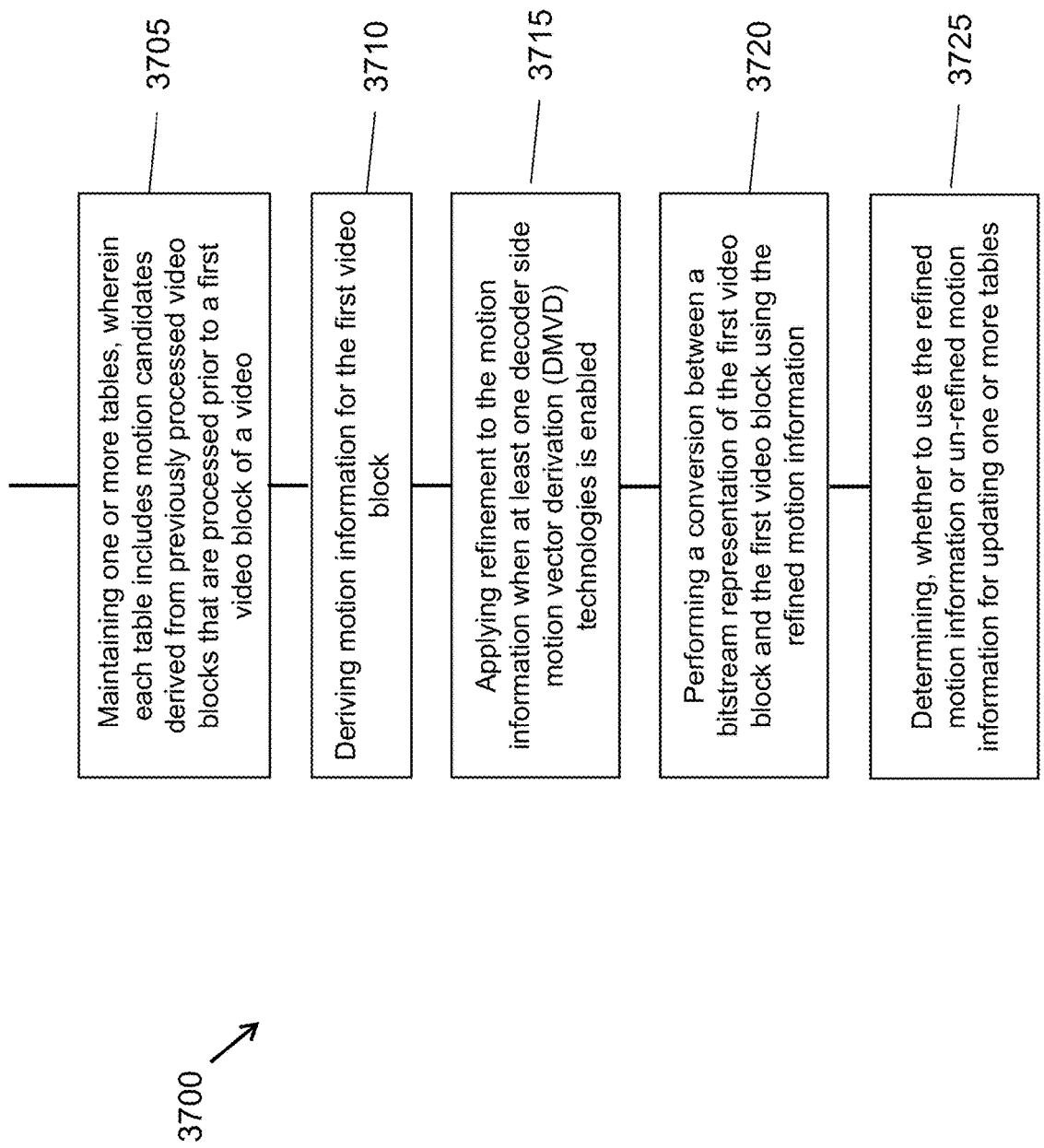
FIG. 37 is a flowchart for an example of a video processing method.

FIG. 37 is a flowchart for a method 3700 of processing a video. The method 3700 includes maintaining (3705) one or more tables, wherein each table includes motion candidates derived from previously processed video blocks that are processed prior to a first video block of a video; deriving (3710) motion information for the first video block; applying (3715) refinement to the motion information when at least one decoder side motion vector derivation (DMVD) technologies is enabled; performing (3720) a conversion between a bitstream representation of the first video block and the first video block using the refined motion information; and determining (3725), whether to use the refined motion information or un-refined motion information for updating one or more tables.

Figure 38:
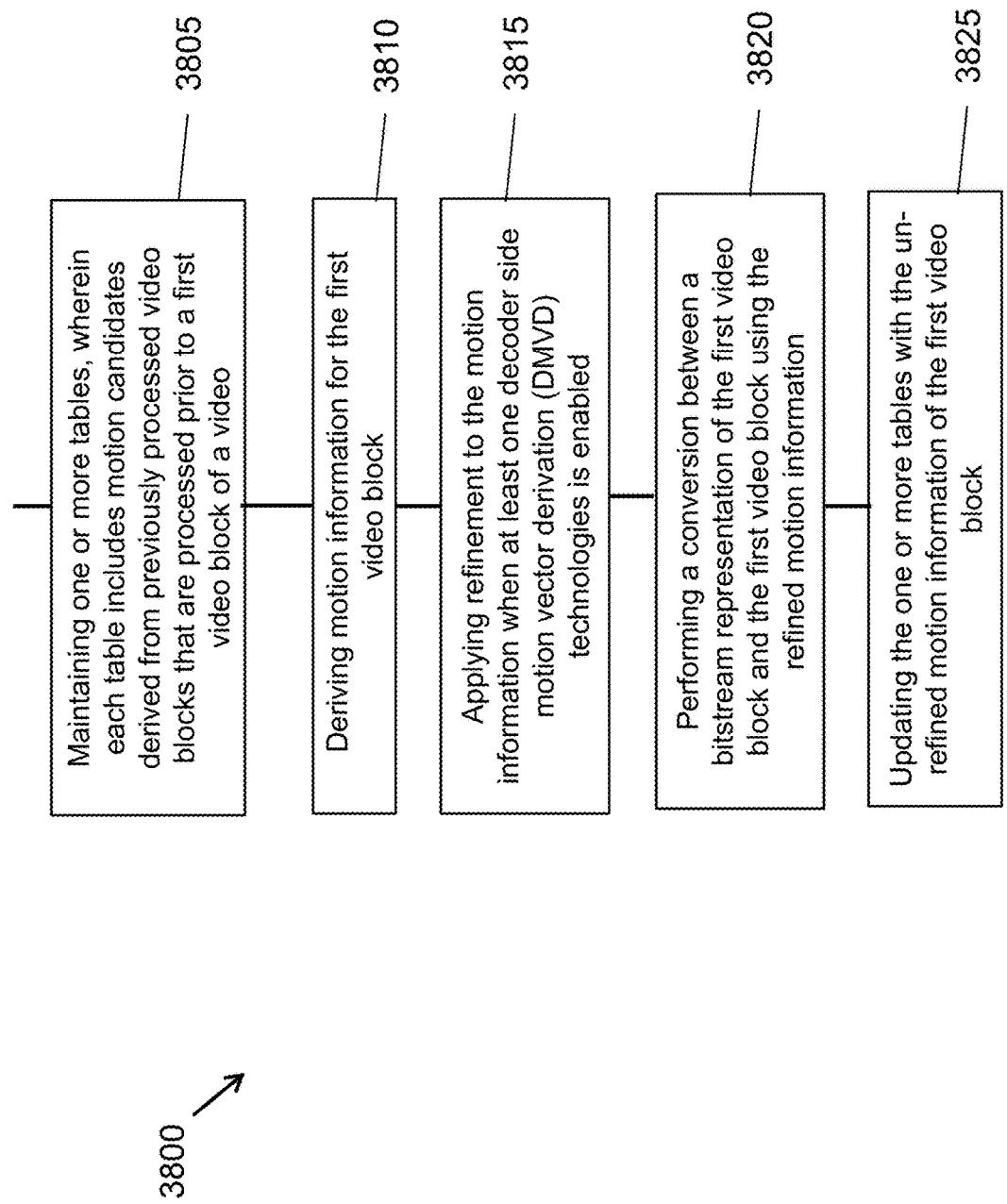
FIG. 38 is a flowchart for an example of a video processing method.

FIG. 38 is a flowchart for a method 3800 of processing a video. The method 3800 includes maintaining (3805) one or more tables, wherein each table includes motion candidates derived from previously processed video blocks that are processed prior to a first video block of a video; deriving (3810) motion information for the first video block; applying (3815) refinement to the motion information when at least one decoder side motion vector derivation (DMVD) technologies is enabled; performing (3820) a conversion between a bitstream representation of the first video block and the first video block using the refined motion information; and updating (3825) the one or more tables with the un-refined motion information of the first video block.

FIG. 39 is a flowchart for a method 3900 of processing a video. The method 3900 includes maintaining (3905) one or more tables, wherein each table includes motion candidates derived from previously processed video blocks that are processed prior to a first video block in a video; deriving (3910) motion information for the first video block; determining (3915), based on whether the motion information is derived from one or more tables, to enable or disable refinement of motion information of the first video block using at least one decoder side motion vector derivation (DMVD) technologies; and performing (3920), based on the determination, a conversion between a bitstream representation of the video and the first video block.

With reference to methods 2600-3900, some examples of motion prediction under a shared merge list and their use are described in Section 4 of the present document.

With reference to methods 2600-3900, a video block may be encoded in the video bitstream in which bit efficiency may be achieved by using a bitstream generation rule related to motion prediction under a shared merge list.

The following examples are provided in the present disclosure.

1. A method for processing video, comprising: maintaining one or more tables, wherein each table includes motion candidates derived from previously processed video blocks that are processed prior to a first video block of a video; deriving motion information for the first video block; applying refinement to the motion information when at least one decoder side motion vector derivation (DMVD) technologies is enabled; performing a conversion between a bitstream representation of the first video block and the first video block using the refined motion information; and determining, whether to use the refined motion information or un-refined motion information for updating one or more tables.

2. The method of example 1, wherein updating the one or more tables with refined motion information is disabled.

3. The method of example 1, wherein updating the one or more tables with un-refined motion information is enabled.

4. The method of any of examples 1-3, wherein updating the one or more tables with refined motion information is enabled.

5. A method for processing video, comprising: maintaining one or more tables, wherein each table includes motion candidates derived from previously processed video blocks that are processed prior to a first video block of a video; deriving motion information for the first video block; applying refinement to the motion information when at least one decoder side motion vector derivation (DMVD) technologies is enabled; performing a conversion between a bitstream representation of the first video block and the first video block using the refined motion information; and updating the one or more tables with the un-refined motion information of the first video block.

6. The method of example 5, wherein updating the one or more tables with refined motion information is disabled.

7. A method for processing video, comprising: maintaining one or more tables, wherein each table includes motion candidates derived from previously processed video blocks that are processed prior to a first video block in a video; deriving motion information for the first video block; determining, based on whether the motion information is derived from one or more tables, to enable or disable refinement of motion information of the first video block using at least one decoder side motion vector derivation (DMVD) technologies; and performing, based on the determination, a conversion between a bitstream representation of the video and the first video block.

8. The method of example 7, wherein DMVD processes are disabled when the motion information is derived from the one or more tables.

9. The method of example 7, further comprising: if the motion information is directly copied from a candidate in the one or more tables, skipping the DMVD processes.

10. The method of example 7, further comprising: if the motion information is generated with motion candidates in the one or more tables, skipping the DMVD processes.

11. The method of example 10, wherein the motion information is from a pair-wise bi-predictive candidate derived from at least one candidate in the one or more tables.

12. The method of any of examples 1-11, wherein the DMVD process comprises at least one of decoder motion vector refinement (DMVR), bi-directional optical flow (BDOF) technolgoies.

13. A method for processing video, comprising: maintaining one or more tables wherein each table includes motion candidates; determining that a first video unit of a video is a sharing node wherein child blocks coded with a specific mode under the first video unit are processed in parallel; deriving motion information for a first child block under the first video unit; performing a conversion between a bitstream representation of the video and the first child block using the derived motion information; and determining, whether to update the one or more tables using the derived motion information for the first child block.

14. The method of example 13, wherein the specific mode is an inter merge mode, the sharing node is a merge sharing node, and the one or more table updating process using the motion information of the first child block under the sharing node is disabled wherein the first child block is coded with the inter merge mode.

15. The method of example 13, wherein the specific mode is an inter AMVP mode, the sharing node is an inter AMVP sharing node, and the one or more table updating process using the motion information of the first child block under the sharing node is disabled wherein the first child block is coded with the inter AMVP mode.

16. The method of example 13, wherein the specific mode is an IBC merge mode, the sharing node is an IBC merge sharing node, and the one or more table updating process using the motion information of the first child block under the sharing node is disabled wherein the first child block is coded with the IBC merge mode.

17. The method of example 13, wherein the specific mode is an inter merge mode, the sharing node is an IBC AMVP sharing node, and the one or more table updating process using the motion information of the first child block under the sharing node is disabled wherein the first child block is coded with the IBC AMVP mode.

18. The method of example 13, further comprising: disabling the one or more table updating process with motion information of any child block under the sharing node.

19. The method of example 13, wherein the updating process of the one or more tables is enabled only for a certain child block and disabled for all other child blocks under the sharing node.

20. The method of example 19, wherein the certain child block is a last child block under the sharing node in an encoding order.

21. The method of example 19, wherein the certain child block is a last child block under the sharing node in a decoding order.

22. The method of example 13, further comprising: storing motion information of all child blocks; and updating the one or more tables by using one or more multiple representative motion information of the motion information of all child blocks.

23. The method of any of examples 1-22, wherein how to update the one or more tables after coding a child block under the shared node depends on coded mode information.

24. The method of example 23, wherein the coded mode information includes regular merge mode and IBC mode.

25. The method of any of examples 1-24, wherein the one or more tables are History-based Motion Vector Prediction (HMVP) tables.

26. The method of any of examples 1-24, wherein the updated one or more tables are utilized for processing a subsequent video block of the video.

27. A video decoding apparatus comprising a processor configured to implement a method recited in one or more of examples 1 to 26.

28. A video encoding apparatus comprising a processor configured to implement a method recited in one or more of examples 1 to 26.

29. A computer program product having computer code stored thereon, the code, when executed by a processor, causes the processor to implement a method recited in any of examples 1 to 26.

The methods can include wherein motion information of a first child video block is excluded from being added to an IBC merge candidate list of a second child video block of a same motion sharing node.

The methods can include wherein performing further processing of the child video blocks includes maintaining a global history-based motion vector prediction (HMVP) table and a temporary HMVP table.

The methods can include copying content from the global HMVP table to the temporary HMVP table; and decoding a first child video block after copying the content from the global HMVP table to the temporary HMVP table.

The methods can include wherein motion information of a first child video block is used to update the global HMVP table, and not used to update the temporary HMVP table.

The methods can include wherein motion candidates stored in the temporary HMV table are used to construct the IBC merge candidate list.

The methods can include wherein the child video blocks compose a motion sharing node, and the child video blocks share a same motion candidate list.

The methods can include wherein the same motion candidate list is an advanced motion vector prediction (AMVP) candidate list.

The methods can include wherein the same motion candidate list is constructed for the sharing node block.

The methods can include wherein the child video blocks compose a parameter sharing node, and the child video blocks share a same cross-component linear model (CCLM), localized illumination compensation (LIC) parameters, or other parameters derived at a decoder-side.

The methods can include wherein shared parameters are derived for the sharing node block.

The methods can include wherein reconstructed samples of a first child video block of the child video blocks is not used in a parameter derivation process for a second child video block of the child video blocks.

The methods can include wherein reference samples of a first child video block of the child video blocks is not used in a parameter derivation process for a second child video block of the child video blocks.

The methods can include wherein motion candidates derived from a history-based motion vector prediction (HMVP) table are not added to the IBC merge candidate list.

The methods can include wherein the motion sharing node or the parameter sharing node are defined to be the same as the merge sharing node used for a regular merge mode.

The methods can include wherein the DMVD process is a decoder side motion vector derivation (DMVD) process.

The methods can include wherein the operational state is disabled based on a merge candidate being copied from the HMVP table.

The methods can include wherein the operational state is disabled based on a merge candidate being generated with motion candidates from the HMVP table.

The methods can include updating the HMVP table with refined motion information of the video block, wherein the operational state is enabled.

The methods can include wherein the operational state is enabled for a first child video block of the child video blocks that is a last block in an encoding order or a decoding order.

The methods can include wherein a conformance bitstream is satisfied based on a merge sharing node or an intra block copy (IBC) merge sharing node being found, and each of the child video blocks that are merge-coded share a same mode.

The methods can include wherein the same mode is regular merge mode.

The methods can include wherein the same mode is triangular prediction mode (TPM).

The methods can include wherein the same mode is intra block copy (IBC) merge mode.

The methods can include wherein the merge sharing node is found, and child video blocks of the merge sharing node share a merge list and share a motion candidate in the merge list.

The methods can include wherein a selected motion candidate index is coded for the child video blocks.

The methods can include wherein the selected motion candidate index is coded based on a child video block being a first merge-coded child video block in an encoding order or a decoding order.

The methods can include wherein the merge sharing node is found, and the child video blocks share a merge list and a motion candidate in the merge list for a mode type.

The methods can include wherein the mode type is regular merge mode, intra block copy (IBC) merge mode, or triangular prediction mode.

It will be appreciated that the disclosed techniques may be embodied in video encoders or decoders to improve compression efficiency using enhanced coding tree structures.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for processing video data, comprising:
maintaining one or more tables wherein each table includes motion candidates;
determining that a first video unit of a video is a sharing node wherein child blocks coded with a specific mode under the first video unit are processed in parallel;
deriving motion information for a first child block under the first video unit;
performing a conversion between a bitstream of the video and the first child block using the derived motion information; and
determining, whether to update the one or more tables using the derived motion information for the first child block,
wherein in a case that the specific mode is an inter advanced motion vector prediction (AMVP) mode and the sharing node is an inter AMVP sharing node, a process to update the one or more table using the motion information of the first child block under the sharing node is disabled, wherein the first child block is coded with the inter AMVP mode, and
wherein in a case that the specific mode is an intra block copy (IBC) AMVP mode and the sharing node is an IBC AMVP sharing node, the process to update the one or more table using the motion information of the first child block under the sharing node is disabled wherein the first child block is coded with the IBC AMVP mode.

2. The method of claim 1, wherein in a case that the specific mode is an inter merge mode and the sharing node is a merge sharing node, the process to update the one or more table using the motion information of the first child block under the sharing node is disabled, wherein the first child block is coded with the inter merge mode.

3. The method of claim 1, wherein in a case that the specific mode is an IBC merge mode and the sharing node is an IBC merge sharing node, the process to update the one or more table using the motion information of the first child block under the sharing node is disabled wherein the first child block is coded with the IBC merge mode.

4. The method of claim 1, further comprising: disabling the process to update the one or more table with motion information of any child block under the sharing node.

5. The method of claim 1, wherein the process to update the one or more tables is enabled only for a certain child block and disabled for all other child blocks under the sharing node.

6. The method of claim 5, wherein the certain child block is a last child block under the sharing node in an encoding order.

7. The method of claim 5, wherein the certain child block is a last child block under the sharing node in a decoding order.

8. The method of claim 1, further comprising:
storing motion information of all child blocks; and
updating the one or more tables by using one or more multiple representative motion information of the motion information of all child blocks.

9. The method of claim 1, wherein how to update the one or more tables after coding a child block under the sharing node depends on coded mode information.

10. The method of claim 9, wherein the coded mode information includes regular merge mode and IBC mode.

11. The method of claim 1, wherein the one or more tables that are updated are utilized for processing a subsequent video block of the video.

12. The method of claim 1, wherein the one or more tables are History-based Motion Vector Prediction (HMVP) tables.

13. The method of claim 1, wherein the conversion includes encoding the first video unit into the bitstream.

14. The method of claim 1, wherein the conversion includes decoding the first video unit from the bitstream.

15. An apparatus for processing video data comprising a processor and a non-transitory memory with instructions thereon, wherein the instructions upon execution by the processor, cause the processor to:
maintain one or more tables wherein each table includes motion candidates;
determine that a first video unit of a video is a sharing node wherein child blocks coded with a specific mode under the first video unit are processed in parallel;
derive motion information for a first child block under the first video unit;
perform a conversion between a bitstream of the video and the first child block using the derived motion information; and
determine, whether to update the one or more tables using the derived motion information for the first child block,
wherein in a case that the specific mode is an inter advanced motion vector prediction (AMVP) mode and the sharing node is an inter AMVP sharing node, a process to update the one or more table using the motion information of the first child block under the sharing node is disabled, wherein the first child block is coded with the inter AMVP mode, and
wherein in a case that the specific mode is an intra block copy (IBC) AMVP mode and the sharing node is an IBC AMVP sharing node, the process to update the one or more table using the motion information of the first child block under the sharing node is disabled wherein the first child block is coded with the IBC AMVP mode.

16. The apparatus of claim 15, wherein the specific mode is selected from one of an inter merge mode, the inter AMVP mode, an IBC merge mode, or the IBC AMVP mode,
wherein the sharing node is correspondingly selected from a merge sharing node corresponding to the inter merge mode, an inter AMVP sharing node corresponding to the inter AMVP mode, an IBC merge sharing node corresponding to the IBC merge mode, or an IBC AMVP sharing node corresponding to the IBC AMVP mode, and
wherein the process to update the one or more table using the motion information of the first child block under the sharing node is disabled wherein the first child block is coded with the selected specific mode.

17. The apparatus of claim 15, wherein how to update the one or more tables after coding a child block under the sharing node depends on coded mode information.

18. The apparatus of claim 15, wherein the process to update the one or more tables is enabled only for a certain child block and disabled for all other child blocks under the sharing node.

19. The apparatus of claim 18, wherein the certain child block is a last child block under the sharing node in an encoding order, or wherein the certain child block is a last child block under the sharing node in a decoding order.

20. A non-transitory computer-readable recording medium storing a bitstream which is generated by a method performed by a video processing apparatus, wherein the method comprises:
maintaining one or more tables wherein each table includes motion candidates;
determining that a first video unit of a video is a sharing node wherein child blocks coded with a specific mode under the first video unit are processed in parallel;
deriving motion information for a first child block under the first video unit;
generating the bitstream based on the derived motion information; and
determining, whether to update the one or more tables using the derived motion information for the first child block,
wherein in a case that the specific mode is an inter advanced motion vector prediction (AMVP) mode and the sharing node is an inter AMVP sharing node, a process to update the one or more table using the motion information of the first child block under the sharing node is disabled, wherein the first child block is coded with the inter AMVP mode, and
wherein in a case that the specific mode is an intra block copy (IBC) AMVP mode and the sharing node is an IBC AMVP sharing node, the process to update the one or more table using the motion information of the first child block under the sharing node is disabled wherein the first child block is coded with the IBC AMVP mode.

* * * * *